(12) United States Patent
Weber et al.

(10) Patent No.: US 8,595,515 B1
(45) Date of Patent: Nov. 26, 2013

(54) POWERING A DATA CENTER

(75) Inventors: Wolf-Dietrich Weber, San Jose, CA (US); Xiaobo Fan, Sunnyvale, CA (US); Luiz Andre Barroso, Mountain View, CA (US)

(73) Assignee: Google Inc., Mountain View, CA (US)

( * ) Notice: Subject to any disclaimer, the term of this patent is extended or adjusted under 35 U.S.C. 154(b) by 572 days.

(21) Appl. No.: 12/134,971

(22) Filed: Jun. 6, 2008

Related U.S. Application Data

(60) Provisional application No. 60/976,386, filed on Sep. 28, 2007, provisional application No. 60/942,963, filed on Jun. 8, 2007.

(51) Int. Cl.
*G06F 1/00* (2006.01)
*G06F 1/32* (2006.01)

(52) U.S. Cl.
USPC ............................................ 713/300; 713/320

(58) Field of Classification Search
USPC ................... 713/300, 310, 320, 340
See application file for complete search history.

(56) References Cited

U.S. PATENT DOCUMENTS

| | | |
|---|---|---|
| 4,954,945 A | 9/1990 | Inoue |
| 5,119,014 A | 6/1992 | Kronberg |
| 5,339,445 A | 8/1994 | Gasztonyi |
| 5,432,947 A | 7/1995 | Doi |
| 5,458,991 A | 10/1995 | Severinsky |
| 5,579,522 A | 11/1996 | Christeson et al. |
| 5,694,307 A | 12/1997 | Murugan |
| 5,694,607 A | 12/1997 | Dunstan et al. |
| 5,828,568 A | 10/1998 | Sunakawa et al. |
| 5,844,884 A | 12/1998 | Szlenski |
| 6,009,177 A | 12/1999 | Sudia |
| 6,055,640 A | 4/2000 | Kageshima et al. |
| 6,223,205 B1 | 4/2001 | Harchol-Balter et al. |
| 6,289,684 B1 | 9/2001 | Guidry, II et al. |
| 6,345,240 B1 | 2/2002 | Havens |
| 6,374,627 B1 | 4/2002 | Schumacher et al. |
| 6,429,706 B1 | 8/2002 | Amin et al. |
| 6,496,366 B1 | 12/2002 | Coglitore et al. |
| 6,506,111 B2 | 1/2003 | Sharp et al. |
| 6,513,145 B1 | 1/2003 | Venkitakrishnan |
| D473,225 S | 4/2003 | Coglitore et al. |
| D475,705 S | 6/2003 | Coglitore et al. |
| 6,584,559 B1 | 6/2003 | Huh |
| 6,594,771 B1 | 7/2003 | Koerber et al. |
| 6,625,737 B1 | 9/2003 | Kissell |
| 6,652,373 B2 | 11/2003 | Sharp et al. |

(Continued)

FOREIGN PATENT DOCUMENTS

WO  WO 2007082351 A1  7/2007

OTHER PUBLICATIONS

General Track: Technical Conference, USENIX, Apr. 10-15, 2005.*

(Continued)

*Primary Examiner* — Thomas Lee
*Assistant Examiner* — Phil Nguyen
(74) *Attorney, Agent, or Firm* — Fish & Richardson P.C.

(57) ABSTRACT

A data center includes a power distribution network having a power capacity, and a plurality of computers drawing power from the power distribution network. Each of the computers has a peak power draw. The power capacity is less than a maximum power draw defined by summing the peak power draw from each of the plurality of computers.

35 Claims, 13 Drawing Sheets

(56) References Cited

U.S. PATENT DOCUMENTS

| | | | |
|---|---|---|---|
| 6,652,374 B2 | 11/2003 | Sharp et al. | |
| 6,667,891 B2 | 12/2003 | Coglitore et al. | |
| 6,668,565 B1 | 12/2003 | Johnson et al. | |
| 6,721,672 B2* | 4/2004 | Spitaels et al. | 702/62 |
| 6,741,467 B2 | 5/2004 | Coglitore et al. | |
| 6,768,222 B1 | 7/2004 | Ricks | |
| 6,775,787 B2 | 8/2004 | Greene | |
| 6,785,827 B2 | 8/2004 | Layton et al. | |
| 6,804,616 B2 | 10/2004 | Bodas | |
| 6,822,859 B2 | 11/2004 | Coglitore et al. | |
| 6,824,362 B2 | 11/2004 | Dodson, III | |
| 6,834,354 B1 | 12/2004 | Togawa | |
| 6,847,995 B1 | 1/2005 | Hubbard et al. | |
| 6,850,408 B1 | 2/2005 | Coglitore et al. | |
| 6,859,366 B2 | 2/2005 | Fink | |
| 6,880,349 B2 | 4/2005 | Johnson et al. | |
| 6,901,521 B2 | 5/2005 | Chauvel et al. | |
| 6,904,534 B2* | 6/2005 | Koenen | 713/323 |
| 6,907,395 B1 | 6/2005 | Hunt et al. | |
| 6,915,438 B2 | 7/2005 | Boros | |
| 6,935,130 B2 | 8/2005 | Cheng et al. | |
| 6,937,947 B2 | 8/2005 | Trembley | |
| 6,967,283 B2 | 11/2005 | Rasmussen et al. | |
| 6,969,922 B2 | 11/2005 | Welches et al. | |
| 6,980,433 B2 | 12/2005 | Fink | |
| 6,986,066 B2 | 1/2006 | Morrow et al. | |
| 7,010,704 B2 | 3/2006 | Yang et al. | |
| 7,011,576 B2 | 3/2006 | Sharp et al. | |
| 7,020,586 B2 | 3/2006 | Snevely | |
| 7,036,035 B2 | 4/2006 | Allison et al. | |
| 7,046,514 B2 | 5/2006 | Fink et al. | |
| 7,082,541 B2* | 7/2006 | Hammond et al. | 713/300 |
| 7,099,784 B2 | 8/2006 | Spitaels et al. | |
| 7,123,477 B2 | 10/2006 | Coglitore et al. | |
| 7,127,625 B2 | 10/2006 | Farkas et al. | |
| 7,145,772 B2 | 12/2006 | Fink | |
| 7,161,557 B2 | 1/2007 | Thornton | |
| 7,173,820 B2 | 2/2007 | Fink et al. | |
| 7,173,821 B2* | 2/2007 | Coglitore | 361/695 |
| 7,178,147 B2 | 2/2007 | Benhase et al. | |
| 7,203,852 B2* | 4/2007 | Cohen et al. | 713/320 |
| 7,203,943 B2 | 4/2007 | Shaffer | |
| 7,210,048 B2 | 4/2007 | Bodas | |
| 7,222,030 B2 | 5/2007 | Banginwar et al. | |
| 7,222,246 B2 | 5/2007 | Pomaranski et al. | |
| 7,228,441 B2* | 6/2007 | Fung | 713/300 |
| 7,240,225 B2 | 7/2007 | Brewer et al. | |
| 7,242,945 B2 | 7/2007 | Reddi | |
| 7,272,517 B1 | 9/2007 | Brey et al. | |
| 7,272,733 B2 | 9/2007 | Pomaranski et al. | |
| 7,278,273 B1 | 10/2007 | Whitted et al. | |
| 7,313,503 B2 | 12/2007 | Nakagawa et al. | |
| 7,349,828 B1 | 3/2008 | Ranganathan et al. | |
| 7,383,137 B2 | 6/2008 | Hanebutte | |
| 7,383,454 B2 | 6/2008 | Loffink et al. | |
| 7,421,599 B2 | 9/2008 | Bahali et al. | |
| 7,430,675 B2 | 9/2008 | Lee | |
| 7,444,526 B2 | 10/2008 | Felter et al. | |
| 7,457,976 B2 | 11/2008 | Bolan et al. | |
| 7,461,273 B2 | 12/2008 | Moore et al. | |
| 7,461,274 B2 | 12/2008 | Merkin | |
| 7,467,306 B2 | 12/2008 | Cartes et al. | |
| 7,467,311 B2 | 12/2008 | Bahali et al. | |
| 7,469,351 B2 | 12/2008 | Baba et al. | |
| 7,487,058 B2 | 2/2009 | Gross et al. | |
| 7,493,235 B2 | 2/2009 | Artman et al. | |
| 7,493,503 B2 | 2/2009 | Aldereguia et al. | |
| 7,496,772 B1 | 2/2009 | Nguyen | |
| 7,499,279 B2 | 3/2009 | Campbell et al. | |
| 7,511,959 B2 | 3/2009 | Belady et al. | |
| 7,511,960 B2 | 3/2009 | Hillis et al. | |
| 7,514,815 B2 | 4/2009 | Paik et al. | |
| 7,525,207 B2 | 4/2009 | Clidaras et al. | |
| 7,529,086 B2 | 5/2009 | Fink et al. | |
| 7,549,069 B2 | 6/2009 | Ishihara et al. | |
| 7,549,070 B2 | 6/2009 | Zwinger et al. | |
| 7,555,666 B2 | 6/2009 | Brundridge et al. | |
| 7,581,125 B2 | 8/2009 | Ranganathan et al. | |
| 7,595,642 B2 | 9/2009 | Doyle | |
| 7,644,148 B2 | 1/2010 | Ranganathan et al. | |
| 7,646,590 B1 | 1/2010 | Corhodzic et al. | |
| 7,647,516 B2* | 1/2010 | Ranganathan et al. | 713/320 |
| 7,675,740 B2 | 3/2010 | Rasmussen et al. | |
| 7,698,580 B2 | 4/2010 | Schindler et al. | |
| 7,701,714 B2 | 4/2010 | Shabany | |
| 7,702,931 B2 | 4/2010 | Goodrum et al. | |
| 7,726,144 B2 | 6/2010 | Larson et al. | |
| 7,756,652 B2 | 7/2010 | Lewis et al. | |
| 7,774,630 B2 | 8/2010 | Hatasaki et al. | |
| 7,783,906 B2 | 8/2010 | Turner et al. | |
| 7,783,909 B2 | 8/2010 | Hatasaki et al. | |
| 7,818,594 B2 | 10/2010 | Gorbatov et al. | |
| 7,827,421 B2 | 11/2010 | Brewer et al. | |
| 7,840,824 B2 | 11/2010 | Baba et al. | |
| 7,844,839 B2 | 11/2010 | Palmer et al. | |
| 7,856,549 B2 | 12/2010 | Wheeler | |
| 7,904,287 B2 | 3/2011 | Lefurgy et al. | |
| 7,996,839 B2 | 8/2011 | Farkas et al. | |
| 8,010,215 B2 | 8/2011 | Borkenhagen et al. | |
| 8,091,087 B2 | 1/2012 | Ali et al. | |
| 8,214,843 B2 | 7/2012 | Boss et al. | |
| 2001/0003207 A1 | 6/2001 | Kling et al. | |
| 2002/0007463 A1* | 1/2002 | Fung | 713/320 |
| 2002/0065049 A1 | 5/2002 | Chauvel et al. | |
| 2002/0194517 A1 | 12/2002 | Cohen et al. | |
| 2003/0005339 A1 | 1/2003 | Cohen et al. | |
| 2003/0055969 A1 | 3/2003 | Begun et al. | |
| 2003/0133263 A1 | 7/2003 | Shu | |
| 2003/0197428 A1 | 10/2003 | Hatton et al. | |
| 2003/0237008 A1 | 12/2003 | Freevol et al. | |
| 2004/0020224 A1 | 2/2004 | Bash et al. | |
| 2004/0150374 A1 | 8/2004 | Kraus | |
| 2004/0163001 A1* | 8/2004 | Bodas | 713/300 |
| 2004/0167732 A1* | 8/2004 | Spitaels et al. | 702/62 |
| 2004/0184232 A1 | 9/2004 | Fink | |
| 2004/0223300 A1 | 11/2004 | Fink et al. | |
| 2005/0012395 A1 | 1/2005 | Eckroad et al. | |
| 2005/0036248 A1 | 2/2005 | Klikic et al. | |
| 2005/0088201 A1 | 4/2005 | Devlin | |
| 2005/0099750 A1 | 5/2005 | Takahashi et al. | |
| 2005/0099770 A1 | 5/2005 | Fink | |
| 2005/0102544 A1 | 5/2005 | Brewer et al. | |
| 2005/0132239 A1 | 6/2005 | Athas et al. | |
| 2005/0170770 A1 | 8/2005 | Johnson et al. | |
| 2005/0171753 A1 | 8/2005 | Rosing et al. | |
| 2005/0240934 A1 | 10/2005 | Patterson et al. | |
| 2006/0007653 A1 | 1/2006 | Fink | |
| 2006/0020832 A1 | 1/2006 | Hung | |
| 2006/0082263 A1 | 4/2006 | Rimler et al. | |
| 2006/0107262 A1 | 5/2006 | Bodas et al. | |
| 2006/0187636 A1 | 8/2006 | Fink et al. | |
| 2006/0259622 A1 | 11/2006 | Moore et al. | |
| 2007/0016814 A1 | 1/2007 | Rusu et al. | |
| 2007/0038414 A1 | 2/2007 | Rasmussen et al. | |
| 2007/0050644 A1* | 3/2007 | Merkin | 713/300 |
| 2007/0076373 A1 | 4/2007 | Fink | |
| 2007/0086364 A1 | 4/2007 | Ellis et al. | |
| 2007/0089446 A1 | 4/2007 | Larson et al. | |
| 2007/0143760 A1 | 6/2007 | Chan et al. | |
| 2007/0198383 A1 | 8/2007 | Dow et al. | |
| 2007/0220292 A1 | 9/2007 | Ishihara et al. | |
| 2007/0274035 A1 | 11/2007 | Fink et al. | |
| 2007/0300083 A1* | 12/2007 | Goodrum et al. | 713/300 |
| 2008/0062647 A1 | 3/2008 | Hillis et al. | |
| 2008/0064317 A1 | 3/2008 | Yates et al. | |
| 2008/0094797 A1 | 4/2008 | Coglitore et al. | |
| 2008/0114997 A1 | 5/2008 | Chin | |
| 2008/0123288 A1 | 5/2008 | Hillis | |
| 2008/0165714 A1 | 7/2008 | Dettinger et al. | |
| 2009/0050591 A1 | 2/2009 | Hart et al. | |
| 2009/0138219 A1 | 5/2009 | Bletsch et al. | |
| 2009/0138313 A1 | 5/2009 | Morgan et al. | |
| 2009/0195977 A1 | 8/2009 | Fink et al. | |
| 2009/0241578 A1 | 10/2009 | Carlson et al. | |

(56) References Cited

U.S. PATENT DOCUMENTS

| | | |
|---|---|---|
| 2010/0050008 A1 | 2/2010 | Allalouf et al. |
| 2010/0138174 A1 | 6/2010 | Archibald et al. |
| 2010/0318827 A1 | 12/2010 | Shah et al. |
| 2011/0106326 A1 | 5/2011 | Anunobi et al. |

OTHER PUBLICATIONS

AMD Opteron Processor with Direct Connect Architecture. [online]. Advanced Micro Devices, Inc., Sep. 2006 [retrieved on Sep. 3, 2009]. Retrieved from the Internet: <URL: http://enterprise.amd.com/downloads/2P_Power_PID_41497.pdf >, 2 pages.

Luiz Andre Barroso, "The Price of Performance: An Economic Case for Chip Multiprocessing", Sep. 2005, ACM Queue, 3(7), pp. 49-53.

Luiz Andre Barroso et al., "Web Search for a Planet: The Google Cluster Architecture", Mar./Apr. 2003, IEEE Micro, 23(2), pp. 22-28.

Pat Bohrer et al., "The Case for Power Management in Web Servers", 2002, Power Aware Computing, pp. 261-289.

Enrique V. Carrera et al., "Conserving Disk Energy in Network Servers", Jun. 23-26, 2003, In ICS 2003: Proceedings of the 17th annual international conference on Supercomputing, pp. 86-97.

Jeffrey S. Chase et al., "Managing Energy and Server Resources in Hosting Centers", 2001, In SOSP 2001: Proceedings of the eighteenth ACM symposium on Operating systems principles, pp. 103-116.

Gilberto Contreras et al., "Power Prediction for Intel XScale® Processors Using Performance Monitoring Unit Events", Aug. 8-10, 2005, In ISLPED 2005: Proceedings of the 2005 international symposium on Low power electronics and design, pp. 221-226.

Jeffrey Dean et al., "MapReduce: Simplified Data Processing on Large Clusters", Jan. 2008, Communications of the ACM, vol. 51, No. 1, pp. 107-113.

Mark Early, P.E. et al., "645.5 Supply Circuits and Interconnecting Cables", 2005 Ed., National Electrical Code Handbook, National Fire Protection Association, pp. 956-957.

Dimitris Economou et al., "Full-System Power Analysis and Modeling for Server Environments". [online] 2006 [Retrieved on Sep. 16, 2009]. Retrieved from the Internet: <URL: http://csl.stanford.edu/~christos/publications/2006.mantis.mobs.pdf>, 8 pages.

Wes Felter et al., "A Performance-Conserving Approach for Reducing Peak Power Consumption in Server Systems", Jun. 20-22, 2005, In ICS 2005: Proceedings of the 19th Annual International Conference on Supercomputing, pp. 293-302.

Mark E. Femal et al., "Safe Overprovisioning Using Power Limits to Increase Aggregate Throughput", Dec. 2004, in 4th International Workshop on Power Aware Computer Systems (PACS 2004), pp. 150-164.

M. E. Femal et al., "Boosting Data Center Performance Through Non-Uniform Power Allocation", Jun. 2005, Proceeding of the Second International Conference on Autonomic Computing (ICAC '05), pp. 1-12.

Taliver Heath et al., "Mercury and Freon: Temperature Emulation and Management for Server Systems", Oct. 21-25, 2006, in International Conference on Architectural Support for Programming Languages and Operating Systems (ASPLOS '06), pp. 106-116.

HP Enterprise Configurator. [online]. Hewlett-Packard Development Company, 2006 [retrieved on Sep. 3, 2009]. Retrieved from the Internet: <URL: <http://h30099.www3.hp.com/configurator/powercalcs.asp>, 2 pages.

Intel® Xeon™ Processor with 512KB L2 Cache at 1.80 GHz to 3 GHz Datasheet. [online]. Intel Corporation, Mar. 2003 [Retrieved on Sep. 24, 2009]. Retrieved from the Internet: <URL: http://download.intel.com/design/Xeon/datashts/29864206.pdf>, 129 pages.

Dual-Core Intel® Xeon® Processor LV and ULV Datasheet. [online]. Intel Corporation, Sep. 2006 [Retrieved on Sep. 3, 2009]. Retrieved from the Internet: <URL: http://download.intel.com/design/intarch/datashts/31139101.pdf>, 72 pages.

Calculating Memory System Power for DDR. [online]. Micron Technology, Inc., 2001 [Retrieved on Sep. 3, 2009]. Retrieved from the Internet: <URL: http://download.micron.com/pdf/technotes/ddr/TN4603.pdf, 26 pages.

J. Mitchell-Jackson et al., "Data Center Power Requirements: Measurements from Silicon Valley", 2003, Energy 28, pp. 837-850.

J. Moore et al., "Data Center Workload Monitoring, Analysis, and Emulation", Feb. 2005, in Eighth Workshop on Computer Architecture Evaluation using Commercial Workloads, 8 pages.

J. Moore et al., "Making Scheduling 'Cool': Temperature-Aware Workload Placement in Data Centers", Apr. 10-15, 2005, In USENIX Annual Technical Conference, pp. 61-74.

Conventional PCI 2.3—An Evolution of the Conventional PCI Local Bus Specification. [online] PCI-SIG, Mar. 29, 2002 [Retrieved on Sep. 16, 2009]. Retrieved from the Internet: <URL: http://www.pcisig.com/members/downloads/specifications/conventional/conventional_pci_2_3.pdf>, 328 pages.

Parthasarathy Ranganathan et al., "Ensemble-level Power Management for Dense Blade Servers", 2006, In ISCA 2006: Proceedings of the 33rd International Symposium on Computer Architecture, 12 pages.

Product Manual Barracuda 7200.7. [online]. Seagate Technology LLC, Sep. 2005 [Retrieved on Sep. 3, 2009]. Retrieved from the Internet: <URL: http://www.seagate.com/support/disc/manuals/ata/cuda7200pm.pdf>, 54 pages.

W. P. Turner IV, P.E. et al., "Tier Classifications Define Site Infrastructure Performance", 2006, The Uptime Institute, White Paper, pp. 1-17.

Cisco Data Center Infrastructure 2.5 Design Guide, Cisco Systems, Inc. 2007, pp. 3-7 to 3-13.

Data Center Design and Implementation with Cisco Catalyst 6500 Services Modules, Cisco Systems, Inc. 2004.

Wolf-Dietrich Weber et al., U.S. Appl. No. 12/134,509, filed Jun. 6, 2008, titled "Computer and Data Center Load Determination".

Wolf-Dietrich Weber et al., U.S. Appl. No. 12/134,611, filed Jun. 6, 2008, titled "Load Control in a Data Center".

Wolf-Dietrich Weber et al., U.S. Appl. No. 13/101,077, filed May 4, 2011, titled "Computer and Data Center Load Determination".

Wolf-Dietrich Weber et al., U.S. Appl. No. 13/101,096, filed May 4, 2011, titled "Load Control in a Data Center".

Wolf-Dietrich Weber et al., U.S. Appl. No. 12/134,970, filed Jun. 6, 2008, titled "Data Center Load Monitoring".

Andrew B. Carlson et al., U.S. Appl. No. 12/060,211, filed Mar. 31, 2008, titled "Data Center Design".

Office Action mailed Jan. 6, 2011, in U.S. Appl. No. 12/134,970 (17 pages).

Office Action mailed Sep. 17, 2010, in U.S. Appl. No. 12/060,211 (19 pages).

Office Action mailed Mar. 25, 2011, in U.S. Appl. No. 12/134,611 (18 pages).

Office Action mailed Dec. 22, 2010, in U.S. Appl. No. 12/134,509 (13 pages).

Final Office Action mailed Apr. 13, 2011, in U.S. Appl. No. 12/060,211 (18 pages).

Cringley, Robert, "Google-Mart: Sam Walton Taught Google More About How to Dominate the Internet Than Microsoft Ever Did," I, Cringely—The Pulpit, Nov. 17, 2005, 3 pages.

Greg Matter Weblog, The Industrial Revolution, Finally, available at: http://blogs.sun.com/Gregp/date/200610, Oct. 17, 2006, 5 pages.

Hamilton, James, "An Architecture for Modular Data Centers" Microsoft Corp,CIDR 2007. 3rd Biennial Conference on Innovative Data Systems Research (CIDR) Jan. 7-10, 2007, Asilomar, California, USA pp. 306-313.

Hamilton, James, "Commodity Data Center Design" Microsoft Corp, Apr. 17, 2007, 11 pgs.

Rackable Systems, "Rackable Systems Contcentro Modular Data Center High Density, High Efficiency Mobile Computing," Datasheet, 2007, 1 page.

Rackable Systems, "Thermal Management & Server Density: Critical Issues for Today's Data Center," White paper, 2004 8 pages.

SANMINA-SCI Product Sheet, ECOBAY, "High-Performance Closed-Loop System," 2006, 2 pages.

Shankland, Stephen, "Sun Blackbox, meet APC's whitebox," cNet News.com, available at http://news.com.com/Sun+Blackbox%2C+meet+APCs+whitebox/2001-1010_3-617774.html, Jan. 7, 2007, 2 pages.

(56) References Cited

OTHER PUBLICATIONS

Sun Project Blackbox—Index, Available at: http://www.sun.com/emrkt/blackbox/index.jsp, Retrieved Oct. 19, 2006, 3 pages.
Sun Project Blackbox—Scenarios, Available at: http://www.sun.com/emrkt/blackbox/scenarios.jsp, Retrieved Oct. 19, 2006, 7 pages.
"Protect High-Density Equipment From Thermal Damage—Guaranteed," APC Currents, vol. 18, No. 4, Sep. 2007, 3 pages.
'Circuit Converts PWM Fan Drive to Linear and Reduces Acoustic Noise' [online]. Maxim/Dallas Semiconductor, 2006, [retrieved on Oct. 23, 2006]. Retrieved from the Internet: <URL: www.maxim-ic.com/appnotes.cfm/an_pk/3530, 3 pages.
'Intelligent Temperature Monitor and PWM Fan Controller' [online] Analog Devices, 2003, [retrieved on Oct. 24, 2006]. Retrieved from the Internet: <URL: www.analog.com/UploadedFiles/Data_Sheets/ADM1030.pdf#xml=http://search.analog.com/search/pdtPainter.aspx?url=http://www.analog.com/UploadedFiles/Data_Sheets/ADM1030.pdf&fterm=Intelligent&fterm=Temperature&fterm=Intelligent Temperature&la=en>, 28 pages.
'LM64—+—1C Remote Diode Temperature Sensor with PWM Fan Control and 5 GPIO's' [online]. National Semiconductor, 2006, [retrieved on Oct. 23, 2006]. Retrieved from the Internet: <URL: http://www.elecdesign.com/Articles/Index.cfm?ArticleID=6281>, 3 pages.
'Low-cost fan manager for power-supply applications' [online]. Electronic Design, 2006, [retrieved on Oct. 23, 2006]. <URL: www.elecdesign.com/Articles/Index.cfm?ArticleID=6281>, 3 pages.
System Management Interface Forum, "PMBus Power System Management Protocol Specification Part 1—General Requirements, Transport and Electrical Interface, Revision 1.0" Mar. 2005, 17 pages.
'T10 Project 1142D—Working Draft SCSI Parallel Interface-2' [online]. American National Standard, 1998, [retrieved on Oct. 23, 2006]. Retrieved from the Internet: <URL: www.t10.org/ftp/t10/drafts/spi2/spi2r20b.pdf>, pp. 181-182.
Office Action mailed Sep. 1, 2011, in U.S. Appl. No. 13/101,096 (20 pages).
Notice of Allowance and Fee(s) Due mailed May 24, 2013, in U.S. Appl. No. 12/134,611 (11 pages).
Office Action mailed Jan. 4, 2012, in U.S. Appl. No. 12/060,211 (28 pages).
Final Office Action mailed Jul. 11, 2011, in U.S. Appl. No. 12/134,970 (27 pages).
Final Office Action mailed Jul. 26, 2011, in U.S. Appl. No. 12/134,509 (18 pages).
Final Office Action mailed Oct. 5, 2011, in U.S. Appl. No. 12/134,611 (20 pages).
Non-Final Office Action mailed Apr. 26, 2012, in U.S. Appl. No. 12/134,611 (23 pages).
Fan et al.; Power Provisioning for a Warehouse-sized Computer; In Proceedings of the ACM International Symposium on Computer Architecture; Jun. 2007, 11 pages.
Non-Final Office Action mailed Apr. 12, 2012, in U.S. Appl. No. 12/134,509 (24 pages).
Non-Final Office Action mailed Feb. 13, 2012, in U.S. Appl. No. 13/101,077 (12 pages).
Final Office Action mailed Apr. 9, 2012, in U.S. Appl. No. 13/101,096 (11 pages).
Chan and More, "Measuring Power in your Data Center," [White Paper], Uptime Institute IT Symposium, 2009, 5 pages.
Cisco, "Data Center Power and Cooling," White Paper, Aug. 2011, 25 pages.
Filani et al., "Dynamic Data Center Power Management: Trends, Issues, and Solutions," Intel Technology Journal. 12 (1):59-67, Feb. 21, 2008, 12 pages.
Gwennap, "AppliedMicro's X-Gene: Minimizing Power in Data-Center Servers," Jul. 2012, 9 pages.
Hewlett Packard, "HP Power Advisor Utility: A Tool for Estimating Power Requirements for HP ProLiant Server Systems," Technology Brief. Aug. 2009, 22 pages.
Hewlett Packard, "Optimizing Facility Operation in High Density Data Center Environments," Technology Brief. Aug. 2007, 26 pages.
Panduit, "Unified Physical Infrastructure (UPI) Strategies for Data Center Networking," White Paper. Jul. 2007, 15 pages.
Sentilla, "Your Data Center: Powered by Sentilla," 2012, 4 pages.
Non-Final Office Action mailed Jun. 18, 2012, in U.S. Appl. No. 13/101,077 (9 pages).
Notice of Allowance and Fee(s) Due mailed Aug. 24, 2012, in U.S. Appl. No. 12/134,509 (6 pages).
Notice of Allowance and Fee(s) Due mailed Jul. 9, 2012, in U.S. Appl. No. 13/101,077 (10 pages).
Final Office Action mailed Jun. 12, 2012, in U.S. Appl. No. 12/060,211 (19 pages).
Lee, Hsin-Hsin. Peeling the Power Onion. CERCS IAB Workshop. Apr. 26, 2010. 27 pages.
Bean et al. Proper Sizing of IT Power and Cooling Loads White Paper. The Green Grid. 2009. 10 pages.
Meisner et al. Peak Power Modeling for Data Center Servers with Switched-Mode Power Supplies. ISLPED 2010. Aug. 2010, 6 pages.
Final Office Action mailed Nov. 7, 2012, in U.S. Appl. No. 12/134,611 (17 pages).
Notice of Allowance and Fee(s) Due mailed Feb. 15, 2013, in U.S. Appl. No. 12/134,611 (7 pages).
Fujitsu Siemens Computers et al. Energy Efficient Infrastructures for Data Centers. White Paper. Jul. 2007. 16 pages.
Jiang et al. Power Aware Job Scheduling with Quality of Service Guarantees: A Preliminary Study. Proceedings of the Second International Symposium on Networking and Network Security. Apr. 2010. 4 pages.
Intel Corporation. Reducing Data Center Energy Consumption. White Paper. 2008. 8 pages.
Sawyer, Richard. Calculating Total Power Requirements for Data Centers. White Paper 3. Revision 1. 2011. 10 pages.
Dell Inc. Advanced Power Management with Dell OpenManage Power Center. Mar. 2012. 21 pages.
Notice of Allowance and Fee(s) Due mailed Dec. 31, 2012, in U.S. Appl. No. 13/101,096 (9 pages).
Notice of Allowance and Fee(s) Due mailed Dec. 5, 2012, in U.S. Appl. No. 12/134,509 (6 pages).
Notice of Allowance and Fee(s) Due mailed Dec. 21, 2012, in U.S. Appl. No. 13/101,077 (7 pages).
Notice of Allowance and Fee(s) Due mailed Mar. 20, 2013, in U.S. Appl. No. 13/101,077 (10 pages).
Notice of Allowance and Fee(s) Due mailed Mar. 25, 2013, in U.S. Appl. No. 12/134,509 (7 pages.).
Rasmussen, Neil. "Guidelines for Specification of Data Center Power Density." APC White Paper 120, (2005), 21 pages.
Office Action mailed May 23, 2013, in U.S. Appl. No. 12/060,211 (22 pages).
Office Action mailed Jul. 11, 2013, in U.S. Appl. No. 12/134,970 (19 pages).

* cited by examiner

| Units | Platform | Application | Power | Subtotal |
|---|---|---|---|---|
| 20 | Company XYZ, 500Mhz, 512Mb, etc. | Search | 350 | 7000 |
| 40 | Company XYZ, 666Mhz, 512Mb, etc. | Search | 375 | 15000 |
| 30 | Company XYZ, 500Mhz, 512Mb, etc. | Electronic Mail | 300 | 9000 |
| 20 | Company ABC, 500Mhz, 512Mb, etc. | Search | 300 | 6000 |
| | | | Total | 37000 |

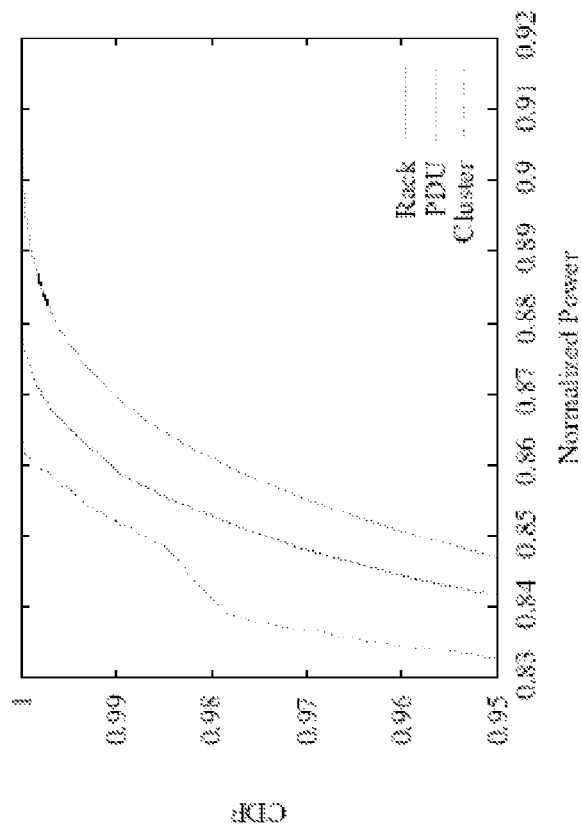
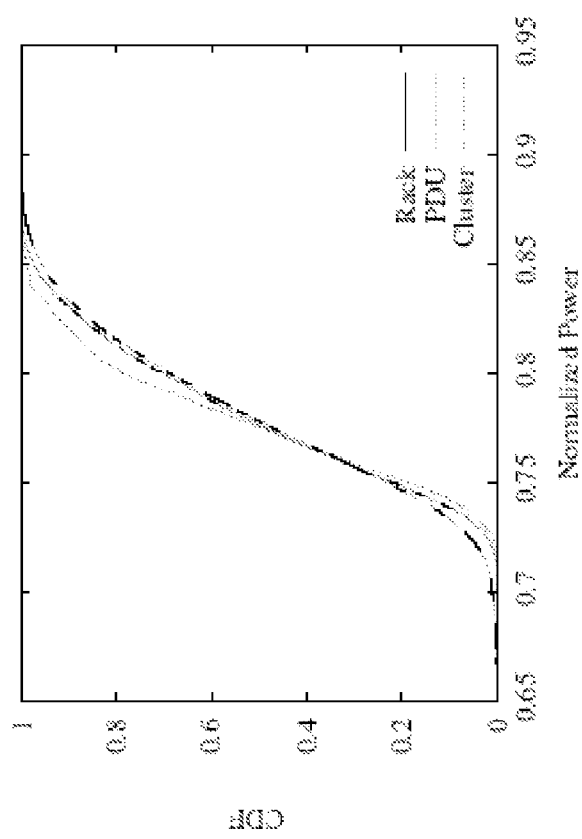
FIG. 10B
FIG. 10A

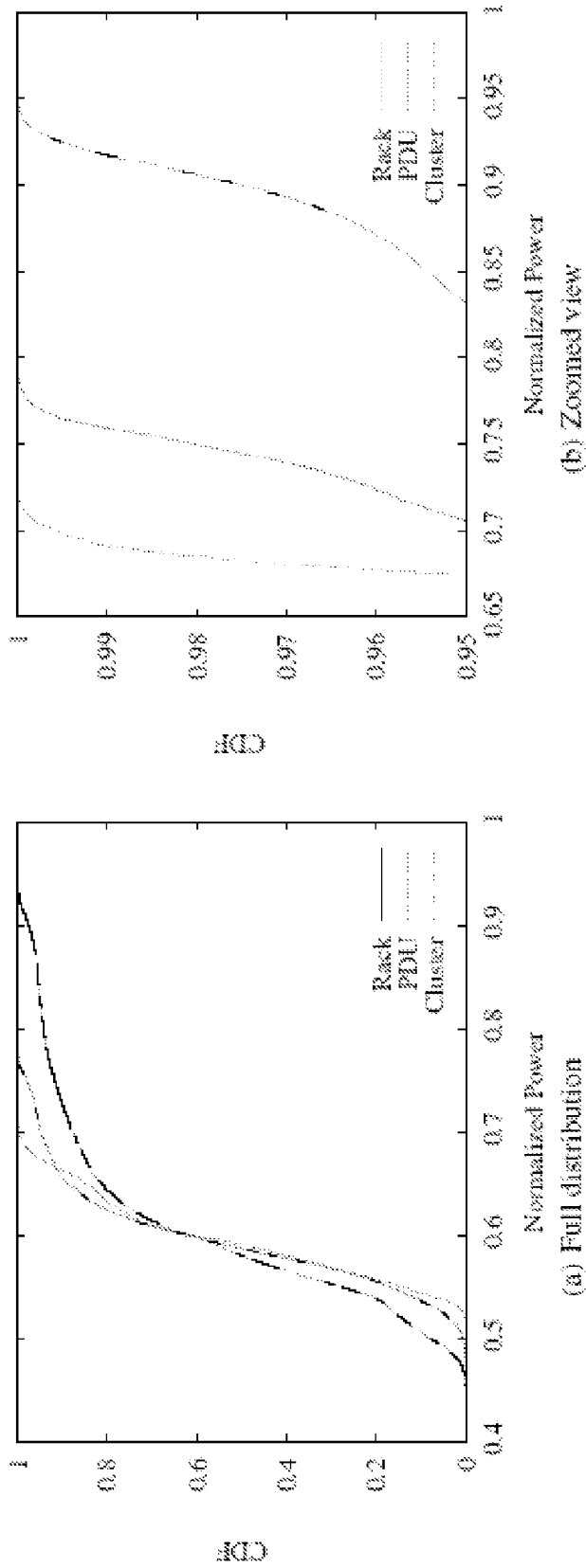
Figure 13: CDF of a Real Datacenter

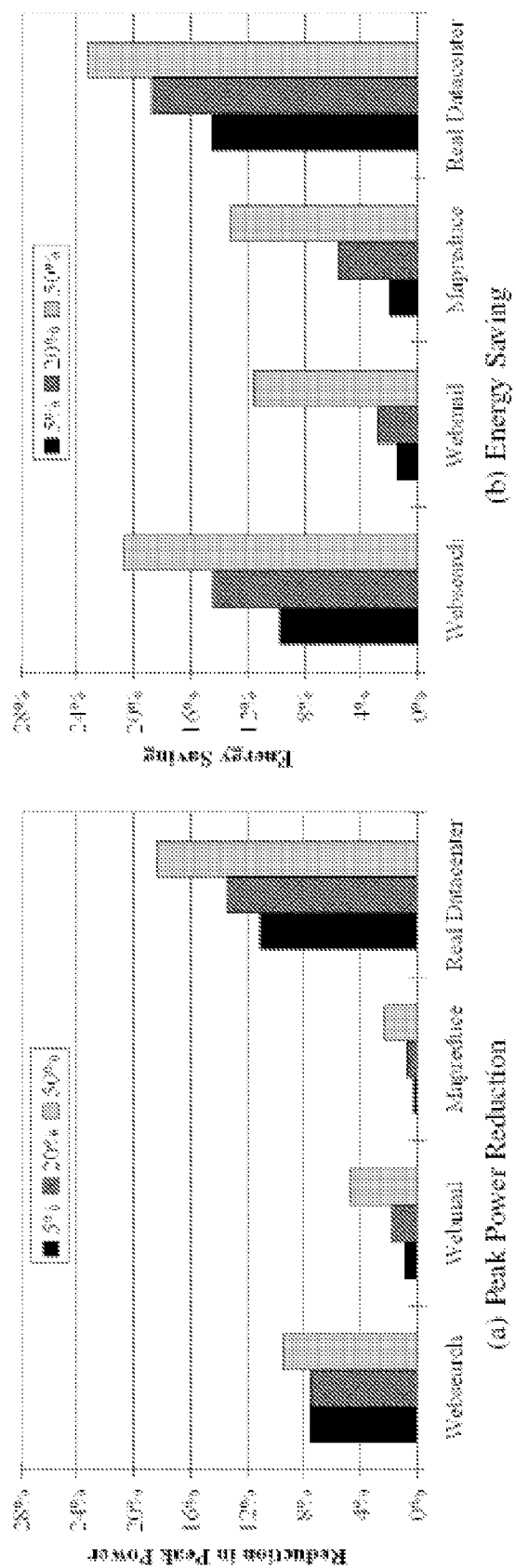
Figure 14: Impact of CPU DVS at Datacenter Level

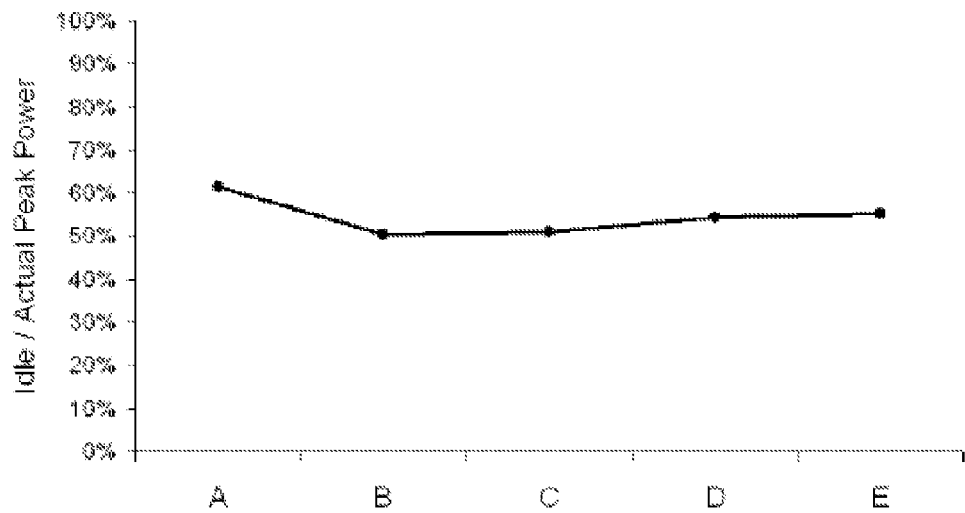
Figure 15: Idle power as fraction of peak power in 5 server configurations
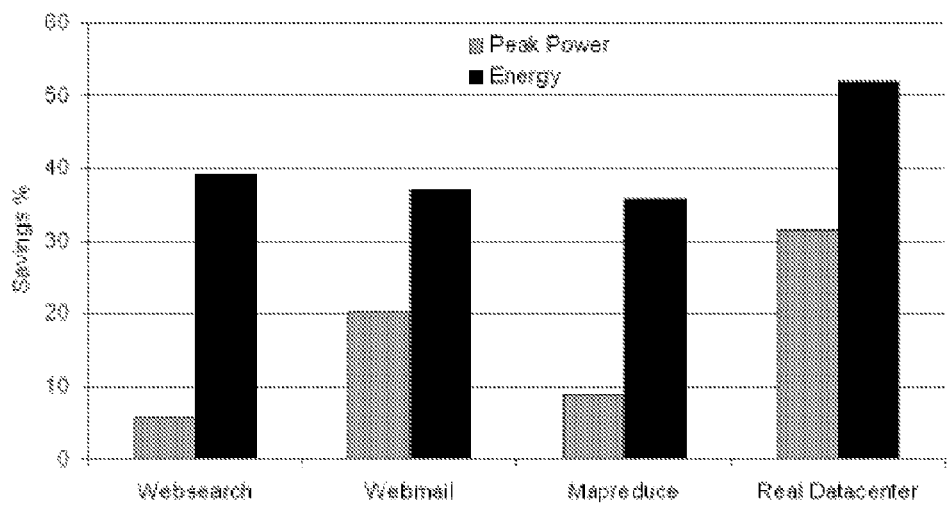
Figure 16: Power and energy savings achievable by reducing idle power consumption to 10% of peak

POWERING A DATA CENTER

CROSS-REFERENCE TO RELATED APPLICATIONS

This application claims priority to U.S. Provisional Application Ser. No. 60/976,386, filed on Sep. 28, 2007, and U.S. Provisional Application Ser. No. 60/942,963 filed on Jun. 8, 2007.

TECHNICAL FIELD

This document relates to data centers, and the design, provisioning and control of data centers.

BACKGROUND

Higher speed computers come with a cost—higher electrical consumption. For a small number of home PCs this extra power may be negligible when compared to the cost of running other electrical appliances in a household. However, in data center applications, where thousands or tens of thousands of microprocessors may be operated, electrical power consumption becomes important.

In addition, the power consumed by a microprocessor is transformed into heat. A pair of microprocessors mounted on a single motherboard can draw 200-400 watts or more of power. If that power draw is multiplied by several thousand (or tens of thousands) to account for the computers in a data center, the potential for heat generation can be appreciated. Thus, not only must a data center operator pay for electricity to operate the computers, it must also pay to cool the computers. The cost of removing heat may be a major cost of operating large data centers.

Large-scale Internet services require a computing infrastructure that can be described as a warehouse-sized computing system. The cost of building data center facilities having the capacity to deliver the power required by such a computing system can rival the recurring power consumption costs themselves.

SUMMARY

In one aspect, a data center includes a power distribution network having a power capacity, and a plurality of computers drawing power from the power distribution network. Each of the computers has a peak power draw. The power capacity is less than a maximum power draw defined by summing the peak power draw from each of the plurality of computers.

Implementations may include one or more of the following. The peak power draw of a computer may be a power draw under a maximum utilization of a central processing unit of the computer. Each of the plurality of computers may run an application, and the peak power draw of a computer may be a maximum power draw exhibited by the computer while running the application. Different computers in the plurality of computers may run different applications, or may have different peak power draws. The plurality of computers may include at least 1000 computers, and the maximum power draw may be more than 5% greater than the power capacity. The plurality of computers may include at least 5000 computers, and the maximum power draw can be more than 7% greater than the power capacity, e.g, about 40% greater than the power capacity.

In another aspect, a method of designing a data center includes determining a design power density, determining an oversubscription ratio, and determining a spatial layout of the data center using the design power density and the oversubscription ratio.

Implementations may include one or more of the following. The facility may be constructed having the spatial layout. Determining the spatial layout may include determining a total length of one or more rows of racks of computers. Determining the total length may include dividing a power budget by the design power density and multiplying by the oversubscription ratio. Determining an oversubscription ratio may include calculating a ratio of peak power draw of a computer to peak power draw per computer of a plurality of computers.

In another aspect, a method of designing a data center includes determining a design power density, the design power density being in units of power per unit length.

Implementations may include one or more of the following. The facility may be constructed having a power carrying-capability meeting the design power density.

In another aspect, a method of deploying computers into a data center includes calculating in a computer an expected peak power draw for a plurality of computers.

Implementations may include one or more of the following. Calculating the expected power draw may include extrapolating a power draw for N computers from a measured power draw of M computers, wherein N is greater than 500 and M is less than 80. M may be 1, and N may be greater than 5000. Extrapolating may include extrapolation based on measurements of power draw by N or greater and M or less computers under a different operating condition than the computers for which the expected power draw is being calculated. The operating condition may be computer configuration or an application being performed by the computer.

In another aspect, a method of monitoring power load of a data center includes storing data representing peak power usage of a plurality of computers in the data center, collecting CPU utilization for at least a statistical sample of the plurality of computers, and calculating a power load of the plurality of computers from the CPU utilization and the peak power usage.

In another aspect, a method of monitoring power load of a data center includes measuring a power usage of a cluster of the data center, measuring a power usage of a power distribution unit (PDU) of the data center, and measuring a power usage of at least one of a rack or a computer within a rack.

In another aspect, a method of monitoring power load of a data center includes determining a power usage for each cluster, each power distribution unit and each rack, and comparing the power usage to a stored maximum power capacity of the cluster, power distribution unit or rack.

Implementations may include one or more of the following. Performance of a plurality of computers may be adjusted if a determined power usage is within a threshold of the maximum power capacity. Adjusting performance may includes adjusting job allocation, adjusting job scheduling, adjusting a central processing unit execution frequency, or shutting down servers. Determining may include calculating the power usage from processor and/or other component utilization, or measuring the power usage.

In another aspect, a method of controlling power usage in a data center includes generating a signal indicating that a power usage is within a threshold of a maximum power capacity, and in response to said signal, adjusting performance of a computer.

Implementations may include one or more of the following. Adjusting performance may include one or more of adjusting job scheduling or adjusting a central processing unit execution frequency.

In another aspect, a method of estimating peak power usage of a computing system having a CPU includes determining the components in the computing system, determining a peak power usage value for each component, and adding the peak power usage value for each component together to result in an actual peak power value.

In another aspect, a method of modeling computer system power usage for a single system includes running a group of computing systems, wherein each computing system has a CPU, measuring total system power usage of the computing system, measuring CPU utilization of each computing system in the group, and determining a line fit to the system power to CPU utilization to create the model.

In another aspect, a method of determining a number of computing systems that can be run in a data center includes determining a total power available, and selecting a number of computing systems based on the method of modeling and an estimated amount of CPU utilization over a given period.

In another aspect, a method of running multiple computing systems to maximize a number of systems in use with the amount of power available includes selecting a first workload type, a second workload type and a third workload type, wherein the first workload type is a service with a high request throughput and large data processing requirements for each request, the second workload type is an Internet service and the third workload type is a service that runs offline batch jobs, determining a power usage for each of the first workload type, second workload type and third workload type, selecting a highest power usage value of the first workload type, second workload type and third workload type, and assigning a number of systems to run the first workload type, second workload type and third workload type based on the amount of power available and the highest power usage value.

In another aspect, a method of safeguarding multiple computing systems in a datacenter includes selecting a value below an actual peak power, monitoring power usage of the multiple computing system during use, predicting future power usage based on requested tasks, determining whether the future power usage will exceed the value, and if the future power usage will exceed the value, implementing component-level power management control functions or descheduling tasks.

In another aspect, a method of modeling to simulate potential for power and energy savings in a datacenter includes selecting a threshold CPU utilization rate, and for each computing machine having a CPU component in a group of computing machines that falls below the threshold CPU utilization rate, reducing the CPU component of total power and leaving power consumption of remaining components of the computing machine unchanged.

In another aspect, a method of modeling non-peak power efficiency includes setting an idle power of each machine in a group of machines at about 10% of actual peak power, and corresponding power usage greater than idle as proportional to increased activity.

Advantages can include one or more of the following. Additional computer equipment can be deployed in a data center within the same power budget with little risk of exceeding the power budget. Cost for excess power capacity of the power distribution equipment can be reduced. The risk of exceeding power budget can be evaluated before upgrading a data center facility with new equipment.

The details of one or more embodiments are set forth in the accompanying drawings and the description below. Other features, objects, and advantages will be apparent from the description and drawings, and from the claims.

DESCRIPTION OF DRAWINGS

FIG. 10A is a graph of a cumulative distribution function of power usage normalized to actual peak for Webmail, and FIG. 10B is an expanded view of a portion of the graph from FIG. 10A.

FIG. 13A shows graphs of cumulative distribution functions for a real datacenter at the rack, PDU and cluster level, and FIG. 13B is an expanded view of a portion of the graph from FIG. 13A.

FIG. 14A is a graph showing of the impact on peak power reduction of CPU voltage scaling at the datacenter level.

FIG. 14B is a graph showing of the impact on energy savings of CPU voltage scaling at the datacenter level. FIG. 14A is a graphs showing of the impact on peak power reduction of CPU voltage scaling at the datacenter level.

FIG. 15 is a graph of the idle power as a fraction of peak power in five server configurations.

FIG. 16 is a graph of the power and energy savings achievable by reducing idle power consumption to 10% of peak.

Like reference symbols in the various drawings indicate like elements.

DETAILED DESCRIPTION

Figure 1A:
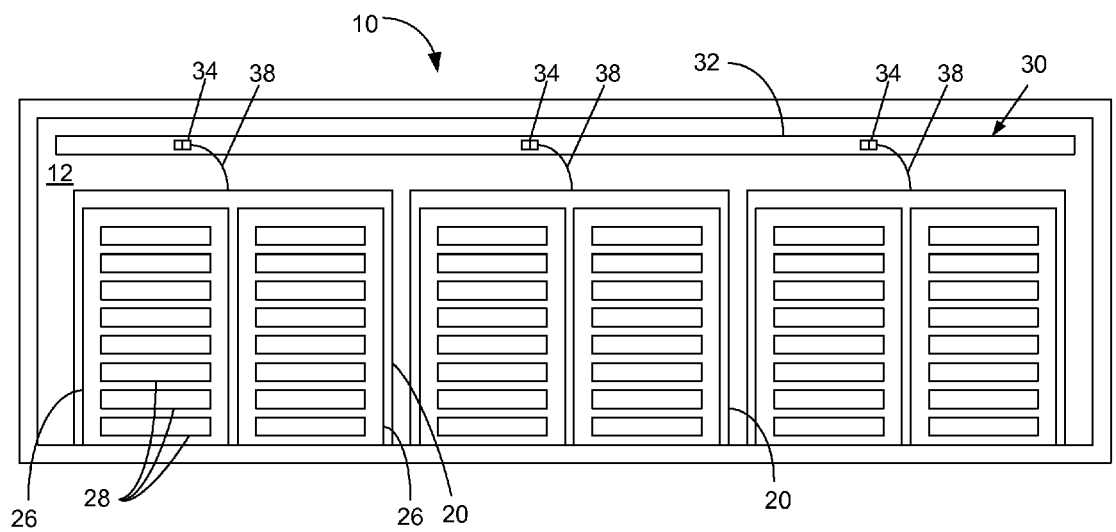
FIGS. 1A and 1B are sectional side and plan views, respectively, of a facility operating as a data center.

Large-scale Internet services and the massively parallel computing infrastructure that is required to support them can require the design of warehouse-sized computing systems, made up of thousands or tens of thousands of computing nodes, their associated storage hierarchy and interconnection infrastructure.

Power is a first-order concern in the design of these massive computing systems. The cost of powering server systems has been steadily rising with higher performing systems, while the cost of hardware has remained relatively stable. If these trends continue, the cost of the power consumed by a server during its lifetime could surpass the cost of the equipment itself.

Another cost factor that has not received significant attention is the cost of building a data center facility having the capacity to deliver the power required by such a massive computing system. Typical data center building costs fall between $10 and $20 per deployed Watt of peak critical power (power for computing equipment only, excluding cooling and other ancillary loads), and electricity costs in the U.S. are approximately $0.80/Watt-year (less than that in areas where large datacenters tend to be deployed). Unlike energy costs that vary with actual usage, the cost of building a data center facility is fixed for a given peak power delivery capacity. Consequently, the more under-utilized a facility, the more expensive it becomes as a fraction the total cost of ownership. For example, if a facility operates at 85% of its peak capacity on average, the cost of building the facility will still be higher than all electricity expenses for ten years of operation (e.g., assuming typical Tier-2 datacenter costs of $11/Watt of critical power and a 50% energy overhead for cooling and conversion losses). Therefore, there is a strong economic incentive to operate facilities as close as possible to maximum capacity, so that the non-recurring facility costs can be best amortized.

Maximizing usage of the available power budget is also important for existing facilities, since it can allow the computing infrastructure to grow or to enable upgrades without requiring the acquisition of new data center capacity, which can take years if it involves new construction.

The power budget available at a given aggregation level is often underutilized in practice, sometimes by large amounts. Some of the important contributing factors to underutilization include the following.

Staged deployment—A facility is rarely fully populated upon initial commissioning, but tends to be sized to accommodate business demand growth. Therefore the gap between deployed and used power tends to be larger in new facilities.

Fragmentation—Power usage can be left stranded simply because the addition of one more unit (a server, rack or PDU) might exceed that level's limit. For example, a 2.5 kW circuit may support only four servers that draw 520 W peak power, which would guarantee a 17% underutilization of that circuit. If a datacenter is designed such that the PDU-level peak capacity exactly matches the sum of the peak capacities of all of its circuits, such underutilization percolates up the power delivery chain and become truly wasted at the datacenter level.

Conservative equipment ratings—Nameplate ratings in computing equipment datasheets typically reflect the worst-case input power of the power supply instead of the actual peak power draw of the specific equipment. As a result, nameplate values tend to drastically overestimate achievable power draw.

Variable load—Typical server systems consume variable levels of power depending on their activity. For example, a typical low-end server system consumes less than half its actual peak power when it is idle, even in the absence of any sophisticated power management techniques. Such variability transforms the power provisioning problem into an activity prediction problem.

Statistical effects—It is increasingly unlikely that large groups of systems will be at their peak activity (therefore power) levels simultaneously as the size of the group increases.

Load variation and statistical effects are the main dynamic sources of inefficiency in power deployment.

In modern, well designed facilities, both conversion losses and cooling overheads can be approximately modeled as a fixed tax over the critical power used. Less modern facilities might have a relatively flat cooling power usage that does not react to changes in the heat load. In either case, the variations in the critical load will accurately capture the dynamic power effects in the facility, and with the aid of some calibration can be used to estimate the total power draw.

The incentive to fully utilize the power budget of a datacenter is offset by the business risk of exceeding its maximum capacity, which could result in outages or costly violations of power provisioning service agreements.

In addition, it is difficult to operate facilities close to maximum capacity in practice because of uncertainties in equipment power ratings and because power consumption tends to vary significantly with the actual computing activity.

Effective power forecasting and provisioning strategies are needed to design a data center facility to deliver the power that will be required by the housed computing equipment, and to determine how much computing equipment can be safely and efficiently hosted within a given power budget. Determining deployment and power management strategies to achieve near maximum power utilization requires understanding the simultaneous power usage characteristics of groups of hundreds or thousands of machines, over time. This is complicated by three important factors: the rated maximum power (or nameplate value) of computing equipment is usually overly conservative and therefore of limited usefulness; actual consumed power of servers varies significantly with the amount of activity, making it hard to predict; different applications exercise large-scale systems differently. Consequently only direct measurement of the actual power draw at the PDU and datacenter level can give accurate power usage characteristics, in particular implementations.

An exemplary data center facility will be described as an introduction to the power forecasting and provisioning issues.

Figure 1B:
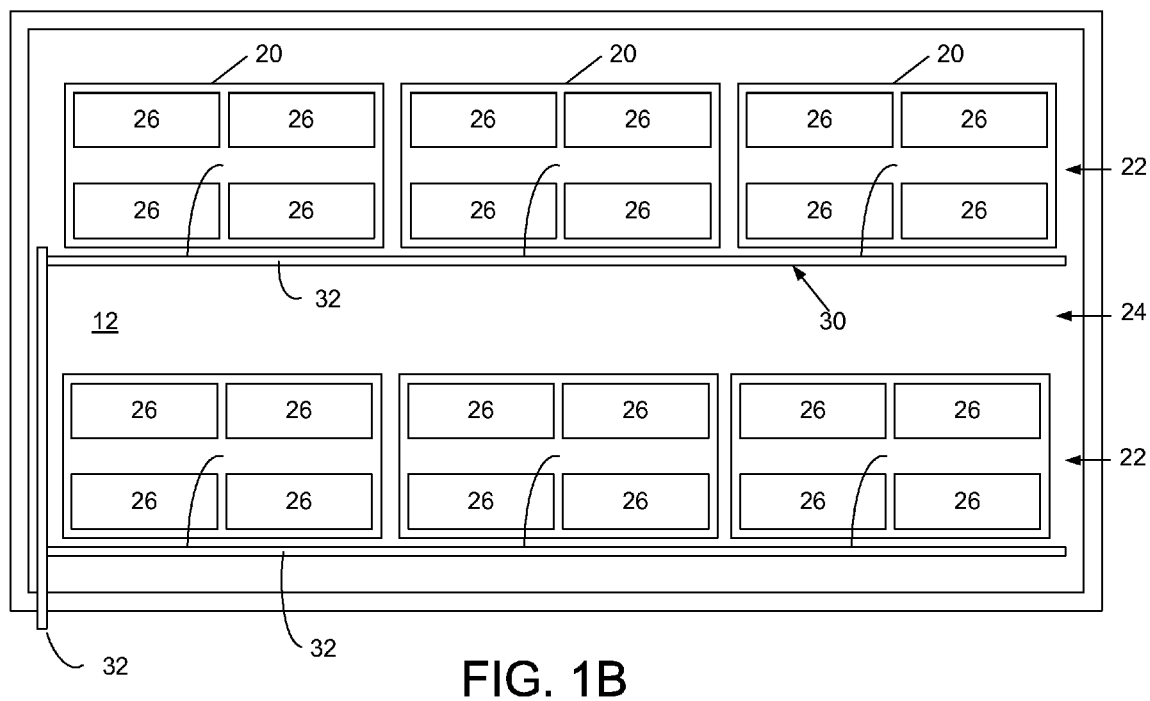

FIGS. 1A and 1B are side and plan views to illustrate an exemplary facility 10 that serves as a data center. The facility 10 includes an enclosed space 12 and can occupy essentially an entire building, or be one or more rooms within a building. The enclosed space 12 is sufficiently large for installation of numerous (dozens or hundreds or thousands of) racks of computer equipment, and thus could house hundreds, thousands or tens of thousands of computers.

Modules 20 of rack-mounted computers are arranged in the space in rows 22 separated by access aisles 24. Each module 20 can include multiple racks 26, and each rack includes multiple trays 28. In general, each tray 28 can include a circuit board, such as a motherboard, on which a variety of computer-related components are mounted. A typical rack 26 is a 19" wide and 7' tall enclosure.

The facility also includes a power grid 30 which, in this implementation, includes a plurality of power distribution "lines" 32 that run parallel to the rows 22. Each power distribution line 32 includes regularly spaced power taps 34, e.g., outlets or receptacles. The power distribution lines 32 could be busbars suspended on or from a ceiling of the facility. Alternatively, busbars could be replaced by groups of outlets independently wired back to the power supply, e.g., elongated plug strips or receptacles connected to the power supply by electrical whips. As shown, each module 20 can be connected to an adjacent power tap 34, e.g., by power cabling 38. Thus, each circuit board can be connected both to the power grid, e.g., by wiring that first runs through the rack itself and the module and which is further connected by the power cabling 38 to a nearby power tap 34.

In operation, the power grid 30 is connected to a power supply, e.g., a generator or an electric utility, and supplies conventional commercial AC electrical power, e.g., 120 or 208 Volt, 60 Hz (for the United States). The power distribution lines 32 can be connected to a common electrical supply line 36, which in turn can be connected to the power supply. Optionally, some groups of power distribution lines 32 can be connected through separate electrical supply lines to the power supply.

Many other configurations are possible for the power grid. For example, the power distribution lines can have a different spacing than the rows of rack-mounted computers, the power distribution lines can be positioned over the rows of modules, or the power supply lines can run perpendicular to the rows rather than parallel.

The facility will also include cooling system to removing heat from the data center, e.g., an air conditioning system to blow cold air through the room, or cooling coils that carry a liquid coolant past the racks, and a data grid for connection to the rack-mounted computers to carry data between the computers and an external network, e.g., the Internet.

The power grid 30 typically is installed during construction of the facility 10 and before installation of the rack-mounted computers (because later installation is both disruptive to the facility and because piece-meal installation may be less cost-efficient). Thus, the size of the facility 10, the placement of the power distribution lines 32, including their spacing and length, and the physical components used for the power supply lines, need to be determined before installation of the rack-mounted computers. Similarly, capacity and configuration of the cooling system needs to be determined before installation of the rack-mounted computers. To determine these factors, the amount and density of the computing equipment to be placed in the facility can be forecast.

Before discussing power forecasting and provisioning issues, it is useful to present a typical datacenter power distribution hierarchy (even though the exact power distribution architecture can vary significantly from site to site).

Figure 2:
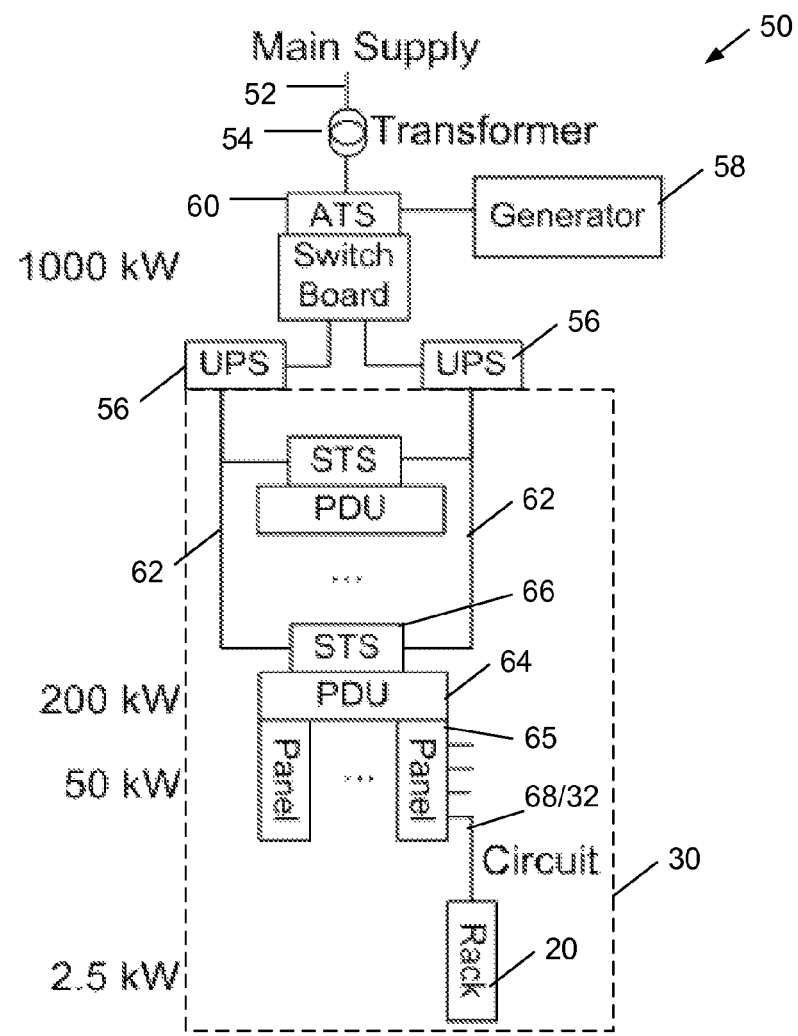
FIG. 2 is a simplified schematic of a datacenter power distribution hierarchy.

FIG. 2 shows the power distribution system 50 of an exemplary Tier-2 datacenter facility with a total capacity of 100 KW. The rough capacity of the different components is shown on the left side. A medium voltage feed 52 from a substation is first transformed by a transformer 54 down to 480 V. It is common to have an uninterruptible power supply (UPS) 56 and generator 58 combination to provide back-up power should the main power fail. The UPS 56 is responsible for conditioning power and providing short-term backup, while the generator 58 provides longer-term back-up. An automatic transfer switch (ATS) 60 switches between the generator and the mains, and supplies the rest of the hierarchy. From here, power is supplied via two independent routes 62 in order to assure a degree of fault tolerance. Each side has its own UPS that supplies a series of power distribution units (PDUs) 64. Each PDU is paired with a static transfer switch (STS) 66 to route power from both sides and assure an uninterrupted supply should one side fail. The PDUs 64 are rated on the order of 75-200 kW each. They further transform the voltage (to 110 or 208 V in the US) and provide additional conditioning and monitoring, and include distribution panels 65 from which individual circuits 68 emerge. Circuits 68, which can include the power cabling 38, power a rack or fraction of a rack worth of computing equipment. The group of circuits (and unillustrated busbars) provides the power grid 30. Thus, there can be multiple circuits per module and multiple circuits per row. Depending on the types of servers, each rack 26 can contain between 10 and 80 computing nodes, and is fed by a small number of circuits. Between 20 and 60 racks are aggregated into a PDU 64.

Power deployment restrictions generally occur at three levels: rack, PDU, and facility. (However, as shown in FIG. 2, four levels may be employed, with 2.5 KW at the rack, 50 KW at the panel, 200 KW at the PDU, and 1000 KW at the switchboard.) Enforcement of power limits can be physical or contractual in nature. Physical enforcement means that overloading of electrical circuits will cause circuit breakers to trip, and result in outages. Contractual enforcement is in the form of economic penalties for exceeding the negotiated load (power and/or energy).

Physical limits are generally used at the lower levels of the power distribution system, while contractual limits may show up at the higher levels. At the rack level, breakers protect individual power supply circuits 68, and this limits the power that can be drawn out of that circuit (in fact the National Electrical Code Article 645.5(A) limits design load to 80% of the maximum ampacity of the branch circuit.). Enforcement at the circuit level is straightforward, because circuits are typically not shared between users.

At higher levels of the power distribution system, larger power units are more likely to be shared between multiple different users. The data center operator must provide the maximum rated load for each branch circuit up to the contractual limits and assure that the higher levels of the power distribution system can sustain that load. Violating one of these contracts can have steep penalties because the user may be liable for the outage of another user sharing the power distribution infrastructure. Since the operator typically does not know about the characteristics of the load and the user does not know the details of the power distribution infrastructure, both tend to be very conservative in assuring that the load stays far below the actual circuit breaker limits. If the operator and the user are the same entity, the margin between expected load and actual power capacity can be reduced, because load and infrastructure can be matched to one another.

Figure 3:
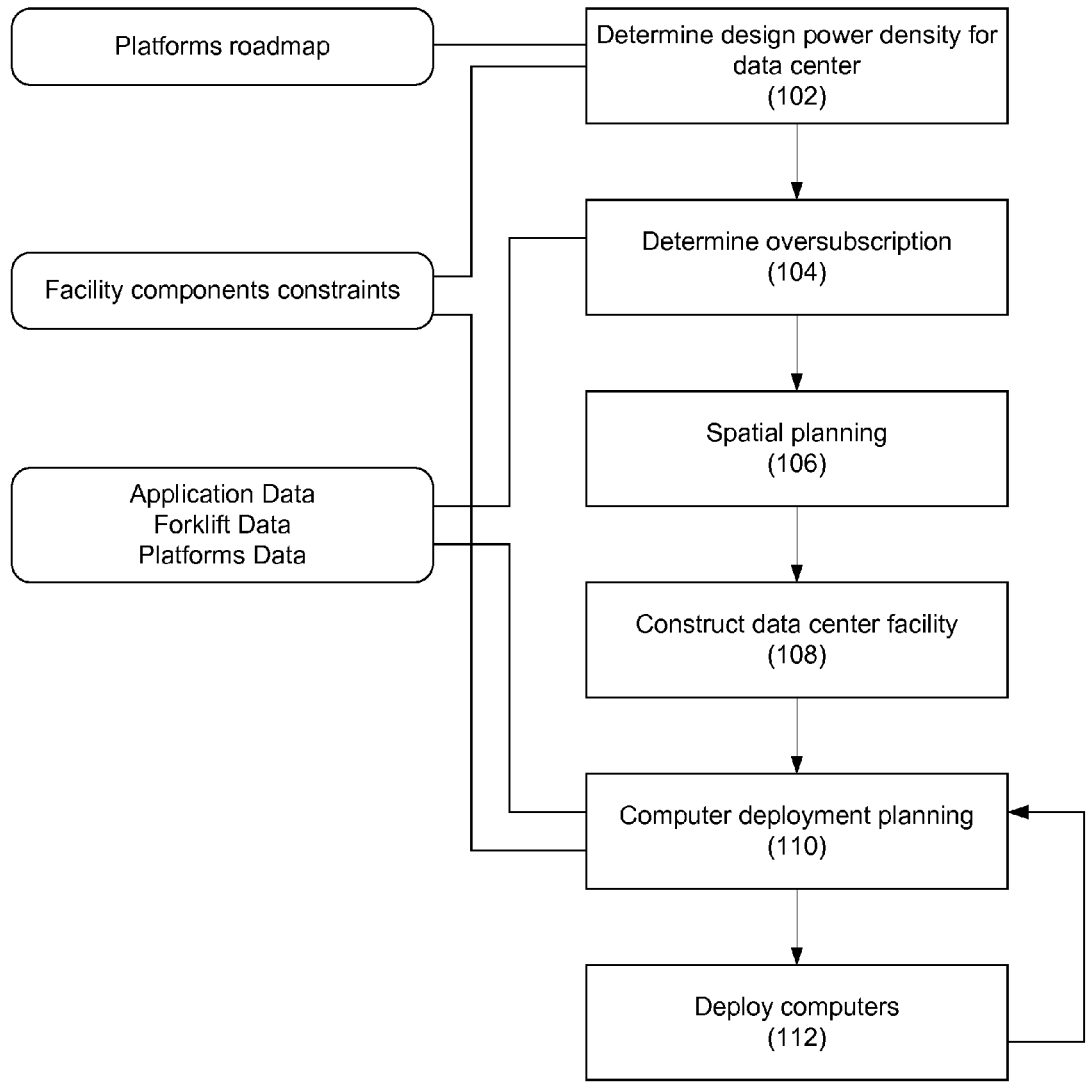
FIG. 3 is flowchart illustrating a method of power planning.

Turning now to power planning, FIG. 3 is a flowchart illustrating a method of power planning to permit facility construction and deployment of computing equipment. The initial two power planning steps are to determine a design power density for the datacenter (step 102) and to determine an oversubscription ratio (step 104).

The design power density is a metric of the peak power draw per spatial unit by the rack-mounted computers in the facility. The design power density sets the power-carrying capacity requirement of the power grid. In particular, the design power density can be given in units of power per length, e.g., kilowatts per foot (kw/ft). This is a useful metric because it sets the power-carrying the density of power taps along a power delivery line and the power capacity of the power taps. In particular, the number of taps per unit length multiplied by the amperage of those taps cannot exceed the design power density. The design power density also sets the power capacity requirements of the power supply cabling, e.g., the circuits. The maximum power capacity requirements of the power distribution lines, e.g., the busbars, can be somewhat lower (on a per circuit basis, not on an absolute basis) than the circuits, since averaging discussed below will lower the peak power draw. The capacity of the physical components, e.g., the busbars, plugs, switching gear, etc., that compose a line are relatively easy to determine (e.g., are often given by manufacturer's specifications). Since the power cabling and power distribution lines do not need to be over-designed, wasted infrastructure cost is avoided.

The inputs used to determine the design power density include a platforms roadmap, and facility component restraints. The platforms roadmap provides a projection of the peak power draw of a typical server computer at a certain point, e.g., three years or five years, into the future. This projection can be calculated by accumulating a data sample of the peak power draws for server computers over a certain age distribution, determining the rate of power draw increase, and assuming that this rate of increase will remain constant. The projection can also be taken from information from computer manufacturers themselves regarding their plans for power draw of future systems.

The platforms roadmap also provides a form factor for the rack-mounted computers and racks themselves. That is, the platforms roadmap provides the number of computers per rack, and the number of racks per unit length along the row. The form factor can be given by assuming that the current form factor remains unchanged, e.g., that racks are 19" wide and hold ten to eighty computers.

For example, assuming that a row is to include two racks, each rack is 19" wide and is to hold twenty-five computers, and each future computer is projected to consume 400 watts of power at peak operation, then the design power density can be calculated as (400 watts/computer*25 computers/rack*2 racks/19"*12"/foot)≈12.6 kw/ft.

The facility component restraints dictate an upper bound of the power density. In particular, above a certain power capacity, the physical components (e.g., busbars, plugs) of the power grid become prohibitively expensive. Thus, the calculated design power density can be check for reasonableness, and if necessary reduced to meet practical cost limitations.

The oversubscription ratio is a ratio of design power density to an average power density for presently available computers. As described above, the design power density is based on the projected peak power draw of a future computer. However, the average power draw is usually lower, and often significantly lower than the peak power draw. There are several factors that contribute to this effect. First, as noted above, the power draw of computers is expected to increase, and thus the power draw for future computers is set higher than the power draw of presently available computers. Second, the peak power draw is greater than the average power draw. In particular, the individual components (e.g., circuits) that carry power need to be able to handle the peak power draw of a computer. However, in the aggregate of thousands of computers, statistically there is a much smaller deviation from the average power draw.

Another way to consider the oversubscription ratio is as ratio of peak power draw over the life of a facility at the computer level to the peak power draw (per presently available computers) at the facility level. Computer utilization may be substituted as a measure of power draw. Thus, the oversubscription ratio can be based on the ratio of peak utilization at the computer level to peak utilization at the facility level.

Inputs for determining the oversubscription ratio include measured platform data, measured application data and "forklift" data. Forklift data is information regarding a target number of platforms, and their type, to move into a facility. Application data includes information regarding the number of type of applications that will be running on the platforms. Platform data includes information from which power usage can be determined for a particular type of platform and application, and can include experimentally determined power usage and utilization data for some platforms.

Initially, power usage data can be collected experimentally. Each data point can include an amount of power drawn, the time of the measurement, and identity of the component (e.g., the particular computer, rack or PDU) that is the subject of the measurement. In particular, a cluster of similar platforms can be run using the same application(s). During this time, the power usage can be measured at the computer level, the rack level, the PDU level, the cluster level and/or the facility level The measurements are performed for sufficient time to obtain a statically significantly sample of power, e.g., for 24 hours. A cluster can be considered to be a large number of computers, e.g., five to ten thousand computer, that are logically connected, e.g., tasked to perform the same application, e.g., serving search requests. There can be more than one cluster in a facility. In addition, as discussed below, rather than measure power usage directly, utilization can be measured, and power usage calculated from utilization.

A power distribution function (percentage time spent at or below a given fraction of peak power) can be determined from the experimentally gathered power usage data at a variety of levels of the power distribution system (e.g., at the computer, rack, PDU, cluster or facility) for a variety of platforms (e.g., each platform is a particular model of computer with a particular processing speed, available memory, etc.) for a variety of applications (e.g., search requests, email, map requests). Average and peak power draw can be calculated from the power distribution function.

In addition, much simpler baseline power usage data can be collected for particular computers that are proposed to be installed in the facility. This baseline power usage data can be a power distribution function for the particular computer as determined experimentally by running a standard application, a measured average or peak power usage as determined experimentally by running a standard application, or simply a nameplate power for collected from manufacturer specifications. Where power usage is determined experimentally, the application can be a high demand application.

The power usage data can be entered into power planning software. The power planning software can include a power usage database that stores the data, and a power calculation algorithm. The algorithm can extrapolate the expected power usage from a baseline for a proposed computer based on the relationships between known power distribution functions. For example, once a power distribution function is measured for a proposed new server running a standard search service, then the peak power usage for a cluster of such servers running such a search service can be extrapolated using the relationship between the measured power distribution functions at the computer and cluster level for other servers running the search service.

In some implementations, the baseline power usage data includes sufficient data from which a power as a function of utilization, e.g., CPU utilization, can be derived for a particular platform and application. For example, the database can include experimentally determined power draw for a given platform and a given application at several different utilization levels. From this data, a linear regression can be used to fit the power draw as a linear function of CPU utilization.

The baseline data can also include sufficient data from which power as a function of utilization can be determined for combinations of platforms and application that have not been experimentally measured. The baseline data can include either a specific model that relates components to the power-utilization function, or data from which a relationship of components to the power-utilization can be derived. For example, the baseline data can include a components database indicating the particular components, e.g., the class and speed of the CPU, the amount of memory, and the number of disk drives, for a particular type of platform. The baseline power data can also include experimentally determined power draw for platforms with different components. The baseline power data can also include experimentally determined power draw for platforms running different applications. The power-utilization function for a platform with a particular combination of components and application (that has not been experimentally measured) can be calculated, e.g., by interpolation, from the data of other platforms with different combinations of components and applications (which have been experimentally measured).

In some implementations, the power-utilization function gives power as a linear function of utilization, with the offset and slope of the line being dependent on the components of the platform and the application. The offset and slope can thus be values that are calculated from available power usage data.

The power usage of a computer can be determined by measuring the utilization and calculating the power from the utilization and the power-utilization function. The power usage of a rack, PDU or cluster can be determined measuring the utilization of all of the computers followed by calculating the power from their power-utilization functions, or measuring the utilization of some of the computers, e.g., a statistical sampling, calculating the power from the power-utilization functions of the sample, and extrapolation from the power draw of the sample to the power draw of the rack, PDU or cluster.

To determine the expected maximum power usage for a computer, the historical utilization data can be analyzed and an expected maximum utilization can be set as the utilization below which the computer spends the vast majority of time as given by a distribution percentile, e.g., at least 95%, e.g., at least 98%, e.g., at least 99%. The expected maximum power usage can then be calculated from the expected maximum utilization and the power-utilization function.

Using the power planning software, an expected power usage can be calculated for an exemplary platform and a desired application. The exemplary platform is selected to be somewhat less demanding than expected future platforms, although possibly somewhat more demanding than a "mid-performance" platform available at the time of design. Given the exemplary platform and the desired application, the expected power usage can be determined at the facility level, and an oversubscription ratio calculated.

In general, either step 102 or step 104 can be performed first. However, once determined, a design power density can be used for multiple facilities, whereas the oversubscription ratio depends on the applications to be performed by the computing system to be installed in a particular facility, and thus can vary from facility. Thus, the design power density tends to be determined first and remain constant for repetition of the oversubscription step for different facilities.

Once the design power density and oversubscription ratio are determined, spatial planning can be performed (step 106). Spatial planning includes determination of size of the facility and layout of the power distribution lines and taps. In particular, given the available power for the facility (e.g., 1 to 2 megawatts), the total length of the row(s) of racks can be calculated by dividing available power by the design power density and multiplying by the oversubscription ratio.

For example, assuming that the available power is 1.5 megawatts, the design power density is 12.6 kw/ft, and the oversubscription ratio is 2, the total row length will be given by (1.5 megawatts/12.6 kw/ft*2)≈238 feet. This could be divided into a single row of 238 feet, two rows of 119 feet, three rows of 80 feet, and so on. In contrast, if the oversubscription ratio is 1.0, then the total row length would be 119 feet, which could be provided by a single row of 119 feet, two rows of 60 feet, etc.

In general, in order to operate the facilities close to maximum power capacity, additional computers are added beyond those that would use the entire power capacity if operating at peak power usage.

The data center facility can now be constructed in accordance with the spatial plan and the design power density (step 108). Thus, the facility can be constructed with an interior volume sufficient to house the total row length calculated above. In addition, the facility can be installed with power distribution lines configured to handle the design power density, and extending through the facility space with sufficient length and spacing to cover the total row length.

In addition, expected heat dissipation can be calculated from the design power density (in general, nearly all of the power consumed by the rack-mounted computers is converted to heat). A cooling system can also be installed in the data center facility with sufficient cooling capacity to expected heat dissipation from the rack-mounted computers.

Deployment of actual rack-mounted computers can be planned (step 110). Deployment planning ensures that a given combination of platforms and applications do not exceed the available power and design power density for the facility. Thus, given an expected usage of the data center (generally as driven by customer demand), e.g., for search requests, email, map requests and the like, and given an intended platform installation, an expected power usage particularized for application and platform can be generated. By summing the expected power usage for each set of platforms and applications, a total expected power usage can be calculated. The expected power usage can be an expected average power usage or an expected maximum power usage.

Figures 4, 5:
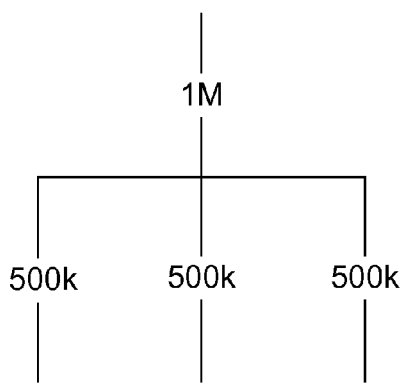
FIG. 4 is a schematic illustration of a graphical user interface from power usage calculation software.
FIG. 5 is a simplified datacenter power distribution hierarchy.

FIG. 4 shows software to perform this calculation can be implemented, e.g., as a spreadsheet, with each record (e.g., row) having field for number of units, particular platform and particular application. The expected power usage per unit can be determined in another field from a lookup table in the spreadsheet that uses the selected platform and application, and this value can be multiplied by the number of units to provide a subtotal. The lookup table can calculate the expected power usage from an expected utilization (which can be set for all records from a user-selected distribution percentile) and the power-utilization function for the combination of platform and application. Finally, the subtotals from each row can be totaled to determine the total power usage.

The deployment planning step can be performed in conjunction with other steps.

Actual rack-mounted computers can now be deployed into the facility in accordance with the plan (step 112).

Once some rack-mounted computers are installed and operating, further power consumption data can be collected to refine the power planner database. In addition, the effects of planned changes, e.g., platform additions or upgrades, can be forecast, effectively repeating the deployment planning step.

In general, this design and deployment scheme balances the short-term and long-term usage of the facility. Although an initial server installation may not use all of the available power, the excess capacity permits equipment upgrades or installation of additional platforms for a reasonable period of time without sacrificing platform density. On the other hand, once available power has been reached, further equipment upgrades can still be performed, e.g., by decreasing the platform density (either by fewer computer per rack or by greater spacing between racks) or by using lower power applications, to compensate for the increased power consumption of the newer equipment.

This design and deployment scheme also permits full utilization of the total power available to the facility, while designing power distribution components within the power distribution network with sufficient capacity to handle peak power consumption. As shown in FIG. 5, a power distribution network might have three PDUs. Although the facility might have 1 megawatt available, each PDU may need 500 KW capacity to handle transient power peaks. If each PDU were run at full capacity, this would exceed the capacity of the facility. By using the power profiling software, the average total power used by the rack-mounted computers can be calculated to confirm that a potential deployment does not exceed the maximum capacity of the facility. Moreover, the percentage usage of the available facility power need not be uniform, but can vary from branch to branch in the distribution hierarchy.

It should also be noted that this scheme permits installation and operation of more rack-mounted computers for a given power budget than would be expected given the peak power draw for a particular computer. In particular, installation can be performed based on the peak power required by a cluster or higher level, rather than the peak power required for a particular rack-mounted computer. In short, at the cluster level, due to the much larger number of computers, power draw is more uniform and peak power draw is closer to the average power draw, than at the platform or rack level.

For example, for a particular application, a particular platform might have an average power draw of 350 watts and peak draw of 400 watts. If installation was performed based on the peak draw of the platform, then the assumption would be that a 1 megawatt capacity facility could hold no more than 2500 such platforms. However, a cluster of platforms running the application might have an average power draw of 350 watts/computer and a peak draw of 375 watts/computer. Thus, a facility with 1 megawatt capacity could actually hold 2666 such platforms safely.

In addition, the effects of deployment can be evaluated "end to end" in the data center. The power usage can be calculated at the rack, STS, PDU and facility level. Thus, deployment can be evaluated for compliance with available capacity at each of these levels.

Once the computers have been deployed, power usage can be monitored on an ongoing (although not necessarily real-time) basis. For example, it is possible to monitor the power usage at the PDU and STS levels. Finer monitoring granularity permits greater control of load balancing. For example, it would be possible to monitor the power usage of each rack or even each computer, although the latter can have significant equipment cost. Another implementation would be to monitor a statistical sampling of computers, e.g., one computer per rack.

In addition, monitoring can be performed "end to end" in the data center. That is power usage can be monitored at the rack, PDU, STS and facility level. In particular, the power hierarchy can be stored in the database such that power usage data for subcomponents of a particular component (e.g., racks within a particular PDU), can be summed to provide the total usage of the particular component.

Once the rack-mounted computers are deployed and operating, it is also possible to perform dynamic power management.

One form of dynamic power management is job allocation, i.e., the decision regarding which tasks are to be performed by which computers. Job allocation can use power management software. The power management software can be similar to the power planning software described above, e.g., able to calculate a peak power usage at the facility, PDU and rack level for given platforms running given applications. For example, the software could maintain a running total of the load on each component of the system based on the assigned job type (e.g., application) and platform (and this would be an indication of the power load, not simply a count of the number of jobs). Jobs can then be preferentially assigned to computers in racks or PDUs with a lower power load so as to avoid overloading any particular component. As another example, if power monitoring indicates that a particular branch of the hierarchy (e.g., a rack) is operating dangerously near maximum capacity, then jobs can be redirected to other portions of the data center. The effect of a proposed allocation of a job to a computer or rack can be evaluated to ensure that capacity of components in the corresponding branches of the power hierarchy are not exceeded.

Another form of dynamic power management is job scheduling, which can be performed at the machine level. For dynamic job scheduling, as the power usage increases, some jobs can be delayed. For example, if measured power usage for a section of the power distribution hierarchy, e.g., a rack or PDU, is approaching its capacity, then a signal can be sent to the computers within that section. In response, those computers can delay some jobs, e.g., low priority jobs.

Yet another form of dynamic power management is execution rate control, which can be performed at the machine level. For dynamic execution rate control, as the power usage increases, the execution frequency of the computers can be reduced. For example, if measured power usage for a section of the power distribution hierarchy, e.g., a rack or PDU, is approaching its capacity, then a signal can be sent to the computers within that section. In response, the those computers can reduce their execution rate, thus reducing their power consumption.

Experimental Results

The power usage characteristics of three large-scale workloads as well as a workload mix from an actual datacenter, each using up to several thousand servers, over a period of about six months are presented. Critical power and how power usage varies over time and over different aggregation levels (from individual racks to an entire cluster) is examined below. A light-weight yet accurate power estimation methodology is used that is based on real time activity information and the baseline server hardware configuration. The model permits estimation of the potential power and energy savings of power management techniques, such as power capping and CPU voltage/frequency scaling.

The aggregate power usage characteristics of large collections of servers (up to 15 thousand) for different classes of applications over a period of approximately six months are described. The observations allow opportunities for maximizing the use of the deployed power capacity of datacenters to be evaluated, and the risks of over-subscribing to be assessed (in this context, over-subscribing refers to the danger of power usage exceeding the power budget at a particular level of power distribution).

Even in well-tuned applications, there is a noticeable gap (7-16%) between achieved and theoretical aggregate peak power usage at the cluster level (thousands of servers). The gap grows to almost 40% in whole datacenters. This headroom can be used to deploy additional computer equipment within the same power budget with minimal risk of exceeding it. A modeling framework is used to estimate the potential of power management schemes to reduce peak power and energy usage. The opportunities for power and energy savings are significant, but greater at the cluster-level (thousands of servers) than at the rack-level (tens). Finally, systems can be power efficient across the activity range, and not only at peak performance levels.

To inventors' knowledge, this is the first power usage study of very large scale systems running real live workloads, and the first reported use of power modeling for power provisioning. Some findings and contributions include the following.

First, the gap between the maximum power actually used by large groups of machines and their aggregate theoretical peak usage can be as large as 40% in datacenters, suggesting a significant opportunity to host additional machines under the same power budget. This gap is smaller but still significant when well-tuned large workloads are considered.

Second, power capping using dynamic power management can enable additional machines to be hosted, but is more useful as a safety mechanism to prevent overload situations.

Third, there are time intervals when large groups of machines are operating near peak power levels, suggesting that power gaps and power management techniques might be more easily exploited at the datacenter-level than at the rack-level.

Fourth, CPU voltage/frequency scaling, a technique targeted at energy management, has the potential to be moderately effective at reducing peak power consumption once large groups of machines are considered.

One of the difficulties of studying power provisioning strategies is the lack of power usage data from large-scale deployments. In particular, most facilities lack on-line power monitoring and data collection systems that are needed for such studies. This problem can be circumvented by deploying an indirect power estimation framework that is flexible, low-overhead and yet accurate in predicting power usage at moderate time intervals. This section begins by describing a framework, and presenting some validation data supporting its accuracy.

Initially, the power usage profile of a typical server and how nameplate ratings relate to the actual power draw of machines will be examined.

A server is typically tagged with a nameplate rating that is meant to indicate the maximum power draw of that machine. The main purpose of this label is to inform the user of the power infrastructure required to safely supply power to the machine. As such, it is a conservative number that is guaranteed not to be reached. It is typically estimated by the equipment manufacturer simply by adding up the worst case power draw of all components in a fully configured system.

Table 1 below shows the power draw breakdown for a server built out of a motherboard with 2×86 CPUs, an IDE disk drive, 4 slots of DDR1 DRAM, and 2 PCI expansion slots. Using the maximum power draw taken from the component datasheets, a total DC draw of 213 W is calculated.

TABLE 1

Component Peak Power Count Total

| Component | Peak Power | Count | Total |
|---|---|---|---|
| CPU [16] | 40 W | 2 | 80 W |
| Memory [18] | 9 W | 4 | 36 W |
| Disk [24] | 12 W | 1 | 12 W |
| PCI Slots [22] | 25 W | 2 | 50 W |
| Motherboard | 25 W | 1 | 25 W |
| Fan | 10 W | 1 | 10 W |
| System Total | | | 213 W |

Assuming a power supply efficiency of 85%, a total nameplate power of 251 W is calculated.

However, when the power consumption of this server is actually measured using the most power intensive benchmarks, only a maximum of 145 W is reached, which is less than 60% of the nameplate value. We refer to this measured rating as the actual peak power. As this example illustrates, actual peak power is a much more accurate estimate of a system's peak consumption, therefore we choose to use it instead of nameplate ratings in our subsequent analysis.

The breakdown shown in Table 1 does nevertheless reflect the power consumption breakdown in a typical server. CPUs and memory dominate total power, with disk power becoming significant only in systems with several disk drives. Miscellaneous items such as fans and the motherboard components round out the picture.

A power model uses CPU utilization as the main signal of machine-level activity. For each family of machines with similar hardware configuration, a suite of benchmarks was run that included representative workloads as well as a few microbenchmarks, under variable loads. The total system power was measured against CPU utilization, and a curve that approximates the aggregate behavior was found.

Figure 6:
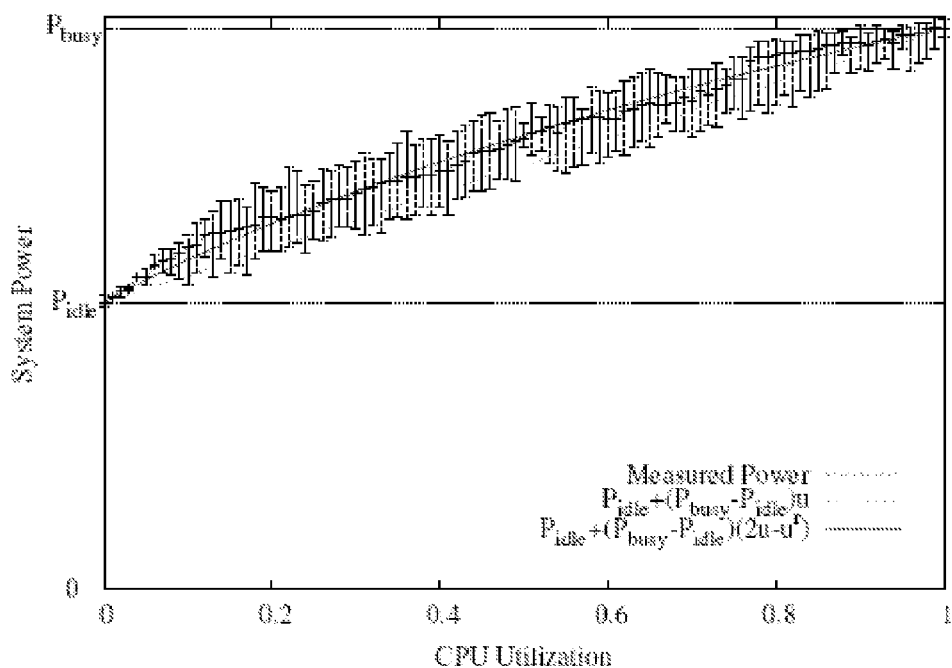
FIG. 6 is a graph of a model fitting system power to CPU utilization at the machine level.

FIG. 6 shows experimental measurements alongside a linear model and an empirical non-linear model that more closely fits the observations. The horizontal axis shows the CPU utilization (u) reported by the OS as an average across all CPUs. A calibration parameter r that minimizes the squared error is chosen (a value of 1.4 in this case). For each class of machines deployed, one set of calibration experiments is needed to produce the corresponding model.

Figure 7:
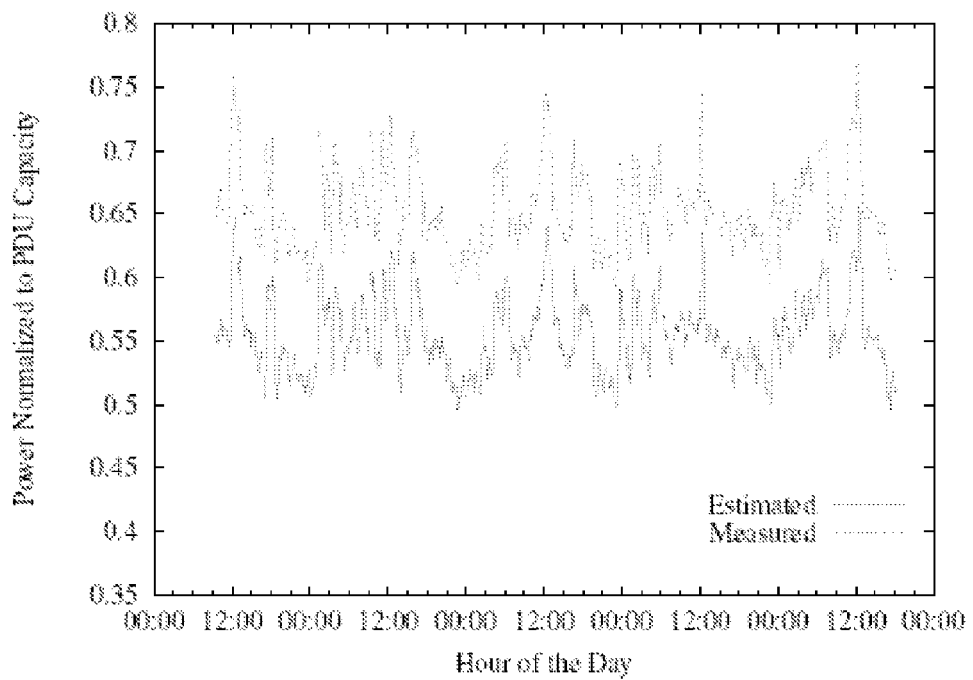
FIG. 7 is a graph of a modeled power versus measured power at the power distribution units level.

The error bars in FIG. 6 give a visual indication that such models can be reasonably accurate in estimating total power usage of individual machines. Of greater interest to this study, however, is the accuracy of this methodology in estimating the dynamic power usage of groups of machines. FIG. 7 shows how the model compares to the actual measured power drawn at the PDU level (a few hundred servers) in a production facility. Note that except for a fixed offset, the model tracks the dynamic power usage behavior extremely well. In fact, once the offset is removed, the error stays below 1% across the usage spectrum and over a large number of PDU-level validation experiments.

The fixed offset is due to other loads connected to the PDUs that are not captured by our model, most notably network switching equipment. Networking switches operate on a very narrow dynamic range (measurements show that Ethernet switch power consumption can vary by less than 2% across the activity spectrum), therefore a simple inventory of such equipment, or a facility-level calibration step is sufficient for power estimation.

This single activity level signal (CPU utilization) produces very accurate results, especially when larger numbers of machines are considered. The observation can be explained by noting that CPU and memory are in fact the main contributors to the dynamic power, and other components either have very small dynamic range (the component measurements showed that the dynamic power range is less than 30% for disks, and negligible for motherboards) or their activity levels correlate well with CPU activity. Therefore, it was unnecessary to use more complex models and additional activity signals (such as hardware performance counters).

Similar modeling methodology can be useful in informing power provisioning plans.

Figure 8:
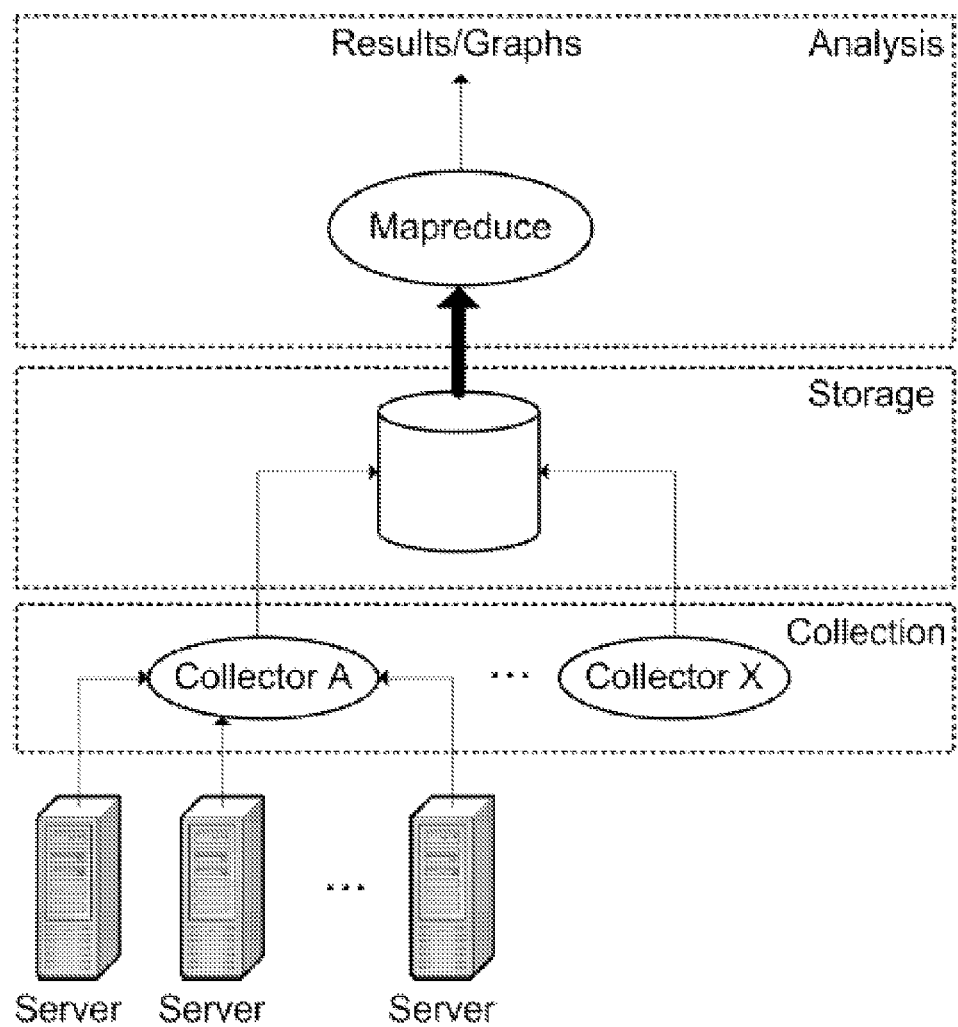
FIG. 8 is a schematic illustration of the collection, storage and analysis architecture.

The Data Collection Infrastructure. In order to gather machine utilization information from thousands of servers, a distributed collection infrastructure was used as shown in FIG. 8. At the bottom layer, collector jobs gather periodic data on CPU utilization from all servers in the collection. The collectors write the raw data into a central data repository. In the analysis layer, different jobs combine CPU activity with the appropriate models for each machine class, derive the corresponding power estimates and store them in a data repository in time series format. Analysis programs are typically built using Google's Mapreduce framework.

Power Usage Characterization. Next, a baseline characterization of the power usage of three large scale workloads and an actual whole datacenter, based on six months of power monitoring observations, is presented.

Three workloads were selected that are representative of different types of large-scale services. The characteristics of these workloads that are relevant to this study are briefly described below.

Websearch: This represents a service with high request throughput and a very large data processing requirements for each request. Machines deployed in Google's Web search services were measured. Overall activity level is generally strongly correlated with time of day, given the online nature of the system.

Webmail: This represents a more disk I/O intensive Internet service. Servers running GMail, a web-based email product with sophisticated searching functionality, were measured. Machines in this service tend to be configured with a larger number of disk drives, and each request involves a relatively small number of servers. Like Websearch, activity level is correlated with time of day.

Mapreduce: This is a cluster that is mostly dedicated to running large offline batch jobs, of the kind that are amenable to the Mapreduce style of computation. The cluster is shared by several users, and jobs typically involve processing terabytes of data, using hundreds or thousands of machines. Since this is not an online service, usage patterns are more varied and less correlated with time of day.

A sample of approximately five thousand servers running each of the workloads above were selected. In each case, the sets of servers selected are running well-tuned workloads and typically at high activity levels. Therefore these servers are representative of the more efficient datacenter-level workloads, in terms of usage of the available power budget.

The main results are shown as cumulative distribution functions (CDFs) of the time that a group of machines spends at or below a given fraction of their aggregate peak power (see for example FIGS. 9A and 9B). For each machine, the average power over 10 minute intervals was derived using the power model described earlier. The aggregate power for each group of 40 machines during an interval makes up a rack power value, which is normalized to their actual peak (i.e., the sum of the maximum achievable peak power consumption of all machines in the group). The cumulative distribution of these rack power values is the curve labeled "Rack" in the graph. The "PDU" curve represents a similar aggregation, but now grouping sets of 20 racks (or about 800 machines). Finally, the "Cluster" curve shows the CDF for all machines (approximately 5000 machines).

Figure 9B:
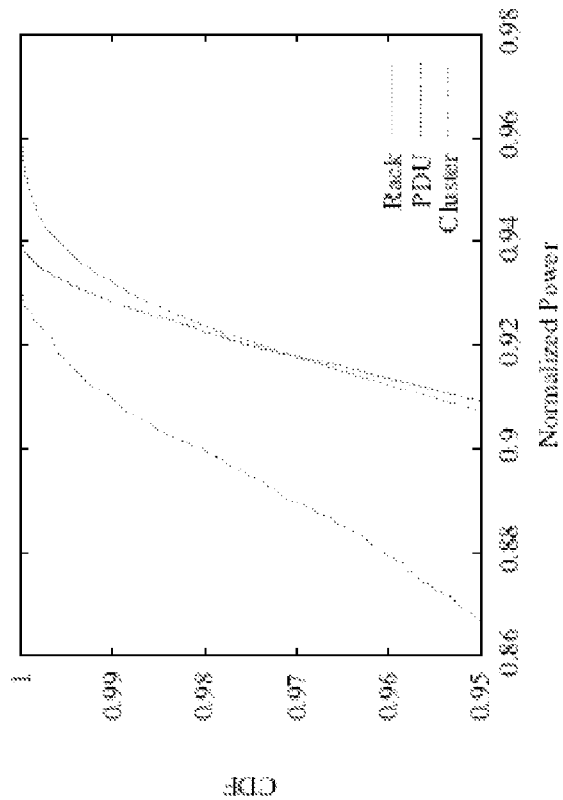
FIG. 9B is an expanded view of a portion of the graph (power from FIG. 9A.
Figure 9A:
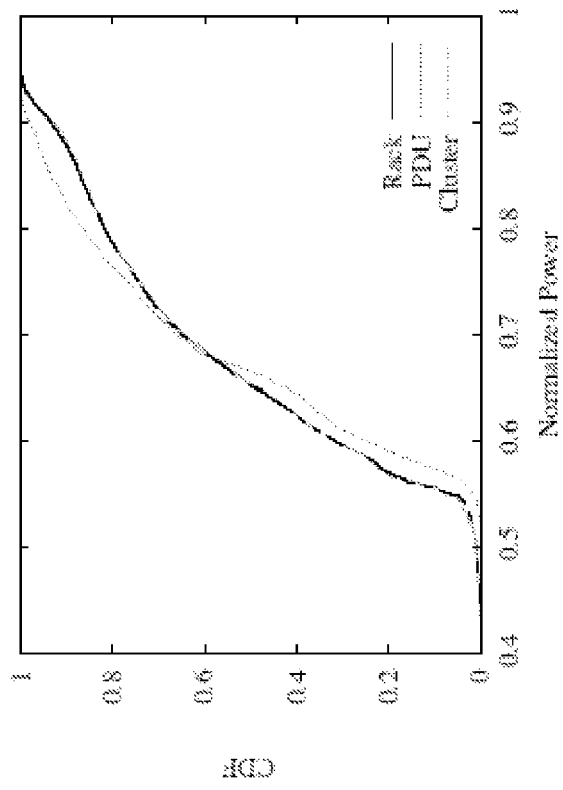
FIG. 9A is a graph of a cumulative distribution function of power usage normalized to actual peak for Websearch.

Turning to the power CDF for Websearch, shown in FIGS. 9A and 9B, the Rack CDF starts at around 0.45 of normalized power, indicating that at no time does any one rack consume less than 45% of its actual peak. This is likely close to the idle power of the machines in the rack. The curve rises steeply, with the largest fraction of the CDF (i.e. the most time) spent in the 60-80% range of actual peak power. The curve intercepts the top of the graph at 98% of the peak power, indicating that there are some time intervals where all 40 machines in a given rack are operating very close to their actual peak power.

The graph of FIG. 9B zooms in on the upper part of the CDF, to make the intercepts with the top of the graph clearer. The PDU and Cluster curves tend to have progressively higher minimum power and lower maximum power. The larger the group of machines is, the less likely it is that all of them are simultaneously operating near the extreme minimum or maximum of power draw. For Websearch, some racks are reaching 98% of actual peak power for some time interval, whereas the entire cluster never goes over 93%. It is striking to see that groups of many hundreds of machines (PDU-level) can spend nearly 10% of the time within 10% of their aggregate peak power.

The corresponding CDFs for Webmail are shown in FIGS. 10A and 10B. The shape of these is similar to that of Websearch, with two notable differences: the dynamic range of the power draw is much narrower, and the maximum power draw is lower. Webmail machines tend to have more disks per machine, and disk power draw does not vary significantly with changes in activity levels. Hence a larger fraction of the power draw of these machines is fixed and the dynamic range is reduced. The max power draw is also lower. Interestingly, there is a maximum of about 92% of peak actual power at the rack level, and 86% at the cluster level; an even higher gap than Websearch.

Figure 11B:
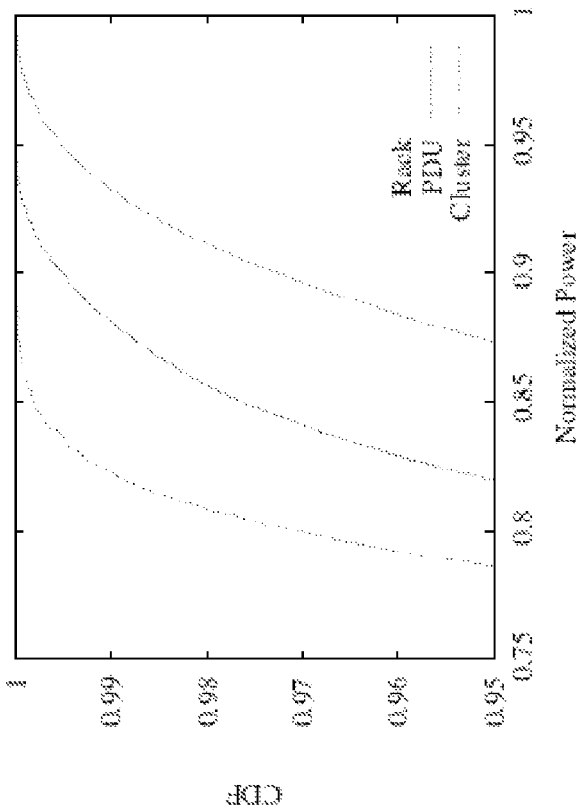
FIG. 11B is an expanded view of a portion of the graph from FIG. 11A.
Figure 11A:
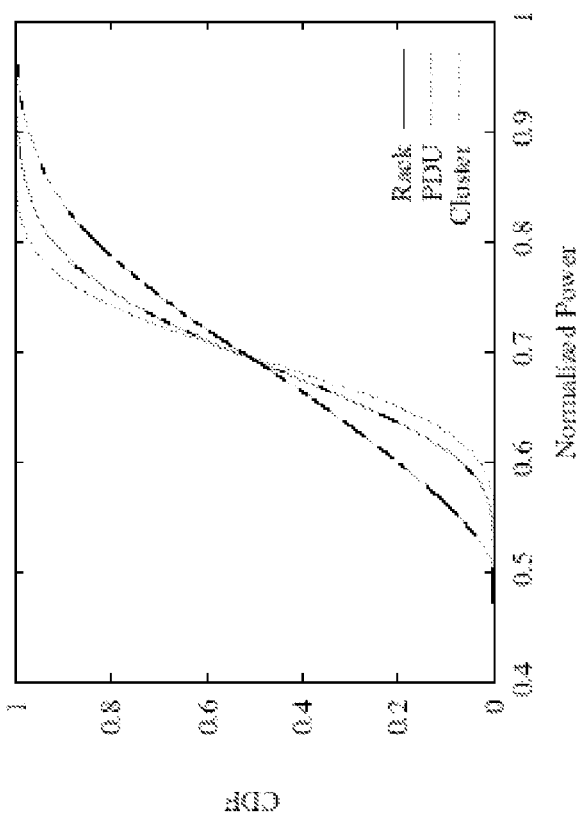
FIG. 11A is a graph of a cumulative distribution function of power usage normalized to actual peak for Mapreduce.

The curves for Mapreduce, as shown in FIGS. 11A and 11B, show a larger difference between the Rack, PDU, and Cluster graphs than both Websearch and Webmail. This indicates that the power draw across different racks is much less uniform; likely a result of its less time-dependent activity characteristics. This behavior leads to a much more noticeable averaging effect at the cluster level. While the racks top out at very close to 100% of peak actual power, the cluster never goes above about 90%.

These results are significant for machine deployment planning. If the maximum power draw of individual machines to provision the datacenter is used, some capacity will be stranded. For Websearch, about 7.5% more machines could be safely deployed within the same power budget. The corresponding numbers for Webmail and Mapreduce are even higher, at 16% and 11%.

Figures 12A, 12B:
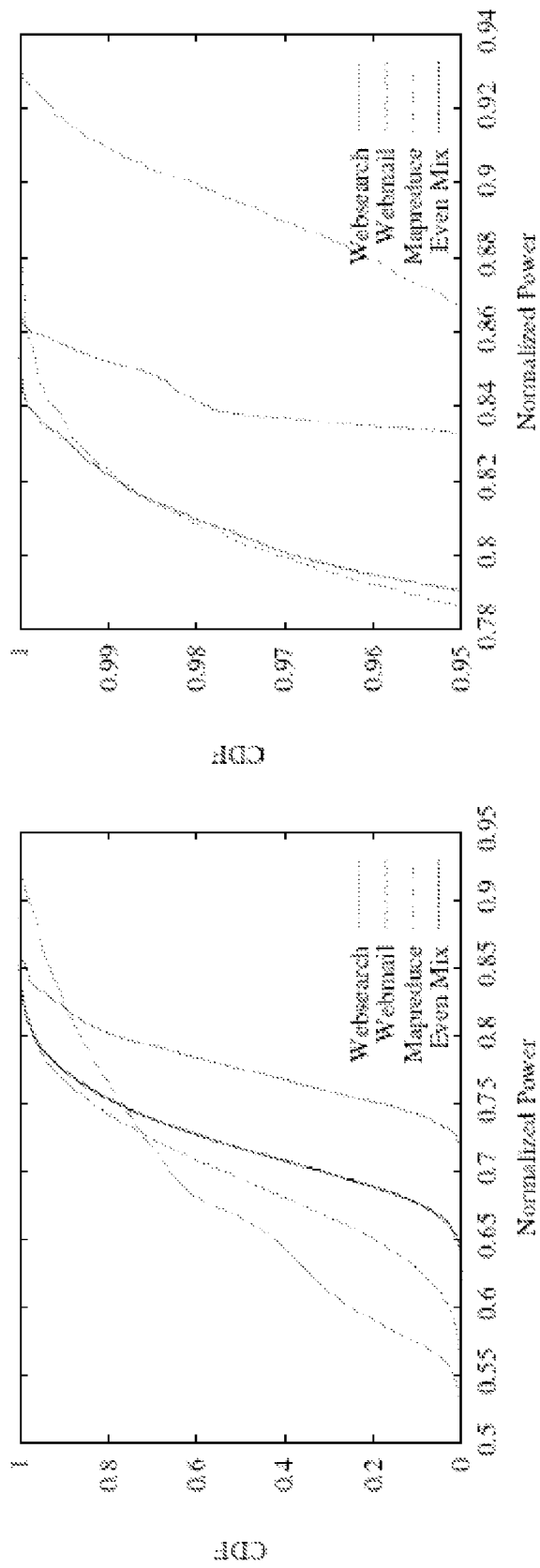
FIG. 12A shows graphs of cumulative distribution functions for Websearch, Webmail, Mapreduce and the mixture of all at the cluster level.
FIG. 12B is an expanded view of a portion of the graph from FIG. 12A.

The impact of diversity—FIGS. 12A and 12B present the power CDF when all the machines running the three workloads are deployed in a hypothetical combined cluster. This might be representative of a datacenter-level behavior where multiple high-activity services are hosted. Note that the dynamic range of the mix is narrower than that of any individual workload, and that the highest power value achieved (85% of actual peak) is also lower than even that of the lowest individual workload (Webmail at 86%). This is caused by the fact that power consumption peaks are less correlated across workloads than within them. It is an important argument for mixing diverse workloads at a datacenter, in order to smooth out the peaks that individual workloads might present. Using the highest power of the mix to drive deployment would allow 17% more machines to be deployed to this datacenter.

An actual datacenter—The examples above concern large, well tuned workloads in a fully deployed environment. In a real datacenter there will be additional workloads that are less well-tuned, still in development, or simply not highly loaded. For example, machines can be assigned to a service that is not yet fully deployed, or might be in various stages of being repaired or upgraded, etc. FIGS. 13A and 13B show the power CDF for one such datacenter. This power CDF exhibits the same trends as seen in the workload mix, only much more pronounced. Overall dynamic range is very narrow (52-72%) and the highest power consumption is only 72% of actual peak power. Using this number to guide deployment would present the opportunity to host a sizable 39% more machines at this datacenter.

One of the features that stands out in the power CDF curves presented in the previous section is that the CDF curve intercepts the 100% line at a relatively flat slope, indicating that there are few time intervals in which close to the highest power is drawn by the machines. If those few intervals could be removed, the number of machines hosted within a given power budget could be further increased. Power capping techniques accomplish that by setting a value below the actual peak power and preventing that number from being exceeded through some type of control loop. There are numerous ways to implement this, but such techniques generally include of a power monitoring system (possibly such as that described above or one based on direct power sensing) and a power throttling mechanism. Power throttling generally works best when there is a set of jobs with loose service level guarantees or low priority that can be forced to reduce consumption when the datacenter is approaching the power cap value. Power consumption can be reduced simply by descheduling tasks or by using any available component-level power management knobs or control functions, such as CPU voltage/frequency scaling.

Note that the power sensing/throttling mechanisms needed for power capping are likely needed anyway even if power is not capped, in order to take advantage of the power usage gaps shown in the CDF graphs. In those cases it is desirable to insure against poorly-characterized workloads or unexpected load spikes.

Table 2, below, presents the gains that could be achieved with such a scheme. For each workload, the potential for increased machine deployment is shown, given an allowance of 1 or 2% of time spent in power-capping mode. The no power capping numbers are also included for comparison. Websearch and Webmail (by themselves) are excluded from power capping, because given their online nature they might not have much opportunity for power reduction at peak load.

TABLE 2

Impact of Power Capping

| Workload | Percentage of Time in Power-Capping Mode | Increase in Machine Deployment | N. of Intervals per Month | Median Interval (min) | Avg Interval (min) |
|---|---|---|---|---|---|
| Websearch | 0% | 7.0% | — | — | — |
| Webmail | 0% | 15.6% | — | — | — |
| Mapreduce | 0% | 11.0% | — | — | — |
|  | 1% | 21.5% | 21.0 | 10.0 | 20.5 |
|  | 2% | 23.8% | 38.8 | 20.0 | 22.2 |
| Mix | 0% | 17.1% | — | — | — |
|  | 1% | 21.7% | 12.2 | 20.0 | 35.3 |
|  | 2% | 23.5% | 23.1 | 20.0 | 37.3 |
| Real Datacenter | 0% | 39.1% | — | — | — |
|  | 1% | 44.7% | 9.0 | 20.0 | 47.9 |
|  | 2% | 46.0% | 12.5 | 40.0 | 69.3 |

Overall, the additional gains in machine deployment are noticeable but relatively modest. Generally, 1% captures most of the benefits with only little additional gains for 2% of capping time. The best case is Mapreduce, which shows an increase from 11% in potential increased machine deployment without power capping, to 24% with capping 2% of the time. Notably, mixing the workloads diminishes the relative gains, because the different workloads are already decreasing the likelihood of a simultaneous power spike in all machines.

Table 2 also shows the number and length of power-capping intervals that would be incurred for each workload. This information gives some insight into how often the power capping system would be triggered, which in turn is useful for deciding on what kind of mechanism to use. Fewer, longer intervals are probably more desirable, because there is always some loss upon entering and leaving the power capping interval.

Perhaps the biggest advantage of dynamic power capping is that it can relax the requirement to accurately characterize workloads prior to deployment, and provide a safety valve for cases where workload behavior changes unexpectedly.

Another interesting observation that can be derived from our data is the difference between the average and observed peak power draw of a workload or mix of workloads. While peak power draw is the most important quantity for guiding the deployment of machines to a datacenter, average power is what determines the power bill. Load-dependent power variations are one of the factors leading to inefficient use of the power budget, as discussed above, and can be quantified.

Table 3, below, shows the ratio of average power to observed peak power (over the half-year interval) for the different workloads and mixes of workloads. The ratios reflect the different dynamic ranges for the different workloads: Websearch has the highest dynamic range and lowest average to peak ratio at 73%. Mapreduce is somewhat higher, and Webmail has the highest ratio at close to 90%. The two mixed workloads also show higher ratios, with 84% for the mix of the three tuned workloads, and 83% for the real datacenter.

TABLE 3

Average and observed peak power (normalized to actual peak) at the cluster level

| Workload | Average Power | Observed Peak Power | Average/ Observed |
|---|---|---|---|
| Websearch | 68.0% | 93.5% | 72.7% |
| Webmail | 77.8% | 86.5% | 89.9% |
| Mapreduce | 69.6% | 90.1% | 77.2% |
| Mix | 72.1% | 85.4% | 84.4% |
| Real DC | 59.5% | 71.9% | 82.8% |

The mix of diverse workloads generally reduces the difference between average and peak power, another argument in favor of this type of deployment. Note that even for this best case, on the order of 15% of the power budget remains stranded simply because of the difference between average and peak power, which further increases the relative weight of power provisioning costs over the cost of energy.

In the previous section, the power modeling infrastructure was used to analyze actual power consumption of various workloads. In the next section, the same activity data from our machines over the six month time period is used to simulate the potential for power and energy saving of two schemes: CPU voltage and frequency scaling, and improving non-peak power efficiency.

CPU voltage and frequency scaling (DVS for short) is a useful technique for managing energy consumption that has recently been made available to server-class processors. Here the power model is used to predict how much energy savings and peak power reductions could have been achieved had power management techniques based on DVS been used in the workloads analyzed in the previous section.

For simplicity and for the purpose of exploring the limits of the benefit, an oracle-style policy is used. For each machine and each data collection interval, if the CPU utilization is below a certain threshold, DVS activation is simulated by halving (there are various CPUs in the market today that are capable of such power reductions through DVS) the CPU component of the total power, while leaving the power consumption of the remaining components unchanged.

How system performance might be affected by DVS cannot be determined without detailed application characterization. Therefore three CPU utilization thresholds can be simulated for triggering DVS: 5%, 20%, 50%. A 5% threshold is selected as a conservative threshold to examine how much benefit can be achieved with almost no performance impact. A 50% threshold is selected as a very aggressive threshold for the scenario where performance can be degraded significantly or the application has substantial amount of performance slack.

FIGS. 14A and 14B show the calculated impact of CPU DVS at the cluster level on the three workloads and on the real datacenter. DVS has a more significant potential impact on energy than peak power, with savings of over 20% when using the more aggressive threshold in two out of four cases. This can be explained since in periods of cluster-wide peak activity it is unlikely that many servers will be below the DVS trigger threshold. It is still surprising that there are cases where DVS can deliver a moderate but noticeable reduction in maximum observed power. This is particularly the case for the real datacenter, where the workload mix enables peak power reductions between 11-18%.

Among the three workloads, Websearch has the highest reduction in both peak power and energy. Websearch is the most compute intensive workload, therefore the CPU consumes a larger percentage of the total machine power, allowing DVS to produce larger reductions relative to total power. DVS achieves the least energy savings for Webmail, which has the narrowest dynamic power range and relatively high average energy usage. Webmail is generally deployed on machines with more disks, and therefore the CPU is a smaller contributor to the total power, resulting in a correspondingly smaller impact of DVS. Mapreduce shows the least reduction in peak power, since it also tends to use machines with more disks while achieving even higher peak power usage than Webmail. These two factors create the most difficult scenario for DVS.

It is also worth noting that due to our somewhat coarse data collection interval (10 min) the DVS upside is somewhat underestimated here. The switching time of the current DVS technology can accommodate a sub-second interval, so bigger savings might be possible using finer-grained triggers.

Power efficiency of computing equipment is almost invariably measured when running the system under maximum load. Generally when "performance per Watt" is presented as a rating, it is implicitly understood that the system was exercised to maximum performance, and upon reaching that the power consumption was measured. However, as the analysis in the previous section showed, the reality is that machines operate away from peak activity a good fraction of the time. Therefore it is important to conserve power across the activity spectrum, and not just at peak activity.

FIG. 15 shows the power consumption at idle (no activity) as a fraction of peak power from five of the server configurations we deploy. Idle power is significantly lower than the actual peak power, but generally never below 50% of peak. Ideally, systems should consume no power when idle, and for power to increase roughly proportionally with increased activity; a behavior similar to the curves in FIG. 6 but where $P_{idle}$ is near zero. Arguably, systems with this behavior would be equally power efficient regardless of activity level. To assess the benefits of such behavioral change, the model was altered so that idle power for every machine was set to 10% of the actual peak power. All other model parameters, including actual peak power, remained the same as before.

The results, shown in FIG. 16, reveal that the gains can be quite substantial. The maximum cluster-level peak power was reduced between 6-20% for our three workloads, with corresponding energy savings of 35-40%. In a real datacenter, however, the observed maximum power consumption dropped over 30%, while less than half the energy was used. The fact that such dramatic gains are possible without any changes to peak power consumption strongly suggest that system and component designers should strive to achieve such behavior in real servers.

It is important to note that the machines in this study, especially the ones running the three workloads, were rarely fully idle. Therefore, inactive power modes (such as sleep or standby modes) are unlikely to achieve the same level of savings.

Power Provisioning Strategies. From the results in the previous sections, some conclusions can be drawn about strategies for maximizing the amount of compute equipment that can be deployed at a datacenter with a given power capacity.

First of all, it is important to understand the actual power draw of the machines to be deployed. Nameplate power figures are so conservative as to be useless for the deployment process. Accurate power measurements of the machines can be used in the actual configurations to be deployed and running benchmarks that maximize overall power draw.

The characterization of application power draw at different levels of deployment granularity allows potential for safely over-subscribing pieces of the power distribution hierarchy to be judged. Over-subscription (in this context, exceeding the power budget) at the rack level is not safe. In both Websearch and Mapreduce, individual racks approach very close to peak actual power during some time intervals. Webmail has a little room for over-subscription at the rack level, at 92%. At the PDU level, more potential for over-subscription exists. At the cluster level, there is a noticeable difference between observed and actual peak power, allowing for the deployment of between 7-16% more machines for individual applications. The headroom increases when applications are mixed together, indicating that it is desirable to do so. Mixing also leads to a narrowing of average to peak power, which is desirable from a utilization of infrastructure standpoint. Finally, we have shown that in a real cluster the deployment of less well tuned applications and other conditions leading to poorly-utilized machines can drive the headroom close to 40%. Once again, this is using peak actual power to guide deployment. The more common practice of using nameplate power further inflates these numbers, leading to headroom for 80-130% more machines to be deployed.

A dynamic power management scheme to cap the peak power draw at some pre-determined value has two advantages. First of all, it can act as a safety valve, protecting the power distribution hierarchy against overdraw. It thus allows for aggressive deployment of machines, even in the face of poorly characterized applications or unexpected load spikes. Secondly, it enables additional over-subscription of the available power. Capping power for even a small fraction of overall time can deliver noticeable additional gains in machine deployment.

While dynamic voltage/frequency scaling may not produce much reduction of peak power draw at the rack level, there is a noticeable reduction at the cluster level. Depending on application, peak power reductions of up to 10% are seen for aggressive schemes, growing up to 18% for the real datacenter workload mix. Even the least aggressive scheme netted an 11% reduction in peak power for the real datacenter mix.

Some of the computing systems being built today look more like a warehouse than a refrigerator. Power provisioning decisions for such systems can have a dramatic economic impact as the cost of building large datacenters could surpass the cost of energy for the lifetime of the facility. Since new datacenter construction can take tens of months, intelligent power provisioning also has a large strategic impact as it may allow an existing facility to accommodate the business growth within a given power budget.

How power usage varies over time, and as the number of machines increases from individual racks to clusters of up to five thousand servers has been studied. By using multiple production workloads, how power usage patterns are affected by workload choice can be quantified. The understanding of power usage dynamics can inform the choice of power management and provisioning policies, as well as quantify the potential impact of power and energy reduction opportunities. To inventors' knowledge, this is the first power usage study at the scale of datacenter workloads, and the first reported use of model-based power monitoring techniques for power provisioning in real production systems.

Nameplate ratings are of little use in power provisioning as they tend to grossly overestimate actual maximum usage. Using a more realistic peak power definition, the gaps between maximum achieved and maximum theoretical power consumption of groups of machines can be quantified. These gaps would allow hosting between 7% and 16% more computing equipment for individual (well-tuned) applications, and as much as 39% in a real datacenter running a mix of applications, through careful over-subscription of the datacenter power budget. Power capping mechanisms can enable those opportunities to be capitalized upon by acting as a safety net against the risks of over-subscription, and are themselves able to provide additional albeit modest power savings. However, over-subscribing power at the rack level is quite risky, given that large Internet services are capable of driving hundreds of servers to high-activity levels simultaneously. The more easily exploitable over-subscription opportunities lie at the facility level (thousands of servers).

CPU dynamic voltage/frequency scaling might yield moderate energy savings (up to 23%). Although it has a more limited peak power savings potential, it is still surprising that a technique usually dismissed for peak power management can have a noticeable impact at the datacenter level.

Finally, component and system designers should consider power efficiency not simply at peak performance levels but across the activity range, as even machines used in well tuned large scale workloads will spend a significant fraction of their operational lives below peak activity levels. Peak power consumption at the datacenter level could be reduced by up to 30% and energy usage could be halved if systems were designed so that lower activity levels meant correspondingly lower power usage profiles.

Various steps of the design processes discussed above, such as an steps involving calculation, particularly determining the design power density and the oversubscription ratio, can be performed by computer.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple processors or computers.

A number of embodiments of the invention have been described. Nevertheless, it will be understood that various modifications may be made without departing from the spirit and scope of the invention. Accordingly, other embodiments are within the scope of the following claims.

What is claimed is:

1. A data center, comprising:
   a power distribution network having a power capacity;
   a first deployment of a plurality of computers installed in the data center that draw power from the power distribution network, each of the computers having a peak power draw, wherein the power capacity is less than a maximum power draw defined by summing the peak power draw from each of the plurality of computers, and
   a second deployment of a cluster of computers installed in the data center subsequent to, and electrically isolatable from, the first deployment of the plurality of computers and comprising between approximately 7% and approximately 46% of the first deployment of the plurality of computers, such that a maximum power draw defined by summing the peak power draw from each of the computers in the first and second deployments of computers is greater than the power capacity, and an operating power draw defined by summing an actual power draw from each of the computers in the first and second deployments of computers is less than the power capacity;
   wherein an amount of the computers in the cluster of computers of the second deployment installed in the data center subsequent to the first deployment of the plurality of computers is based, at least partially, on a workload type executing on the computers, and
   the amount of the computers in the cluster of computers of the second deployment installed in the data center subsequent to the first deployment of the plurality of computers is further based, at least partially, on a percentage of operating time of the computers in the first and second deployments spent in a power-capping mode.

2. The data center of claim 1, wherein the peak power draw of a computer is a power draw under a maximum utilization of a central processing unit of the computer.

3. The data center of claim 1, wherein each of the plurality of computers runs an application, and the peak power draw of a computer is a maximum power draw exhibited by the computer while running the application.

4. The data center of claim 3, wherein different computers in the plurality of computers run different applications.

5. The data center of claim 1, wherein different computers in the plurality of computers have different nameplate peak power draws.

6. The data center of claim 1, wherein the plurality of computers includes at least 1000 computers.

7. The data center of claim 6, wherein the maximum power draw is more than 5% greater than the power capacity.

8. The data center of claim 1, wherein the plurality of computers includes at least 5000 computers.

9. A method of operating a data center, comprising:
   deploying a first plurality of computers to a data center;
   operating the first plurality of computers in the data center, each of the computers having a peak power draw;
   distributing power to the plurality of computers through a power distribution network having a power capacity, wherein the power capacity is less than a maximum power draw defined by summing the peak power draw from each of the plurality of computers;

subsequently to deploying the first plurality of computers, deploying a second plurality of computers to the data center comprising between approximately 7% and approximately 46% of the first plurality of computers, such that a maximum power draw defined by summing the peak power draw from each of the computers in the first and second plurality of computers is greater than the power capacity, and an operating power draw defined by summing an actual power draw from each of the computers in the first and second plurality of computers is less than the power capacity, the first plurality of computers being operable while the second plurality of computers is being deployed;

prior to deploying the second plurality of computers to the data center, determining an amount of the computers in the cluster of computers of the second deployment installed in the data center subsequent to the first deployment of the plurality of computers is based, at least partially, on a workload type executing on the computers; and prior to deploying the deploying a second plurality of computers to the data center, determining the amount of the computers in the cluster of computers of the second deployment installed in the data center subsequent to the first deployment of the plurality of computers is further based, at least partially, on a percentage of operating time of the computers in the first and second deployments spent in a power-capping mode.

10. The method of claim 9, wherein the peak power draw of a computer is a power draw under a maximum utilization of a central processing unit of the computer.

11. The method of claim 9, wherein each of the plurality of computers runs an application, and the peak power draw of a computer is a maximum power draw exhibited by the computer while running the application.

12. The method of claim 11, wherein different computers in the plurality of computers run different applications.

13. The method of claim 9, wherein different computers in the plurality of computers have different peak power draws.

14. The method of claim 9, wherein the plurality of computers includes at least 1000 computers.

15. The method of claim 14, wherein the maximum power draw is more than 5% greater than the power capacity.

16. The method of claim 9, wherein the plurality of computers includes at least 5000 computers.

17. The method of claim 16, wherein the maximum power draw is more than 7% greater than the power capacity.

18. The method of claim 17, wherein the maximum power draw is about 40% greater than the power capacity.

19. The data center of claim 1, wherein a utilization of the processing unit of the computer is determined based at least in part on experimentally measured data that correlates the utilization with a platform-type of the computer and a type of an application executed with the computer.

20. The data center of claim 19, wherein the peak power draw of the computer is determined based on a linear regression of the utilization of the computer.

21. The data center of claim 1, wherein a utilization of the processing unit of the computer is determined based at least in part on a model that correlates the utilization with a platform-type of the computer and a type of an application executed with the computer.

22. The data center of claim 21, wherein the correlation of utilization with a platform-type of the computer and a type of an application executed with the computer comprises an interpolation of experimentally measured data that correlates a utilization of another computer in the plurality of computers with a platform-type of the other computer and a type of an application executed with the other computer.

23. The data center of claim 1, wherein the second deployment of the cluster of computers comprises between approximately 7% and approximately 16% of the first deployment of the plurality of computers.

24. The data center of claim 23, wherein the peak power draw is a peak actual power draw from the computer.

25. The data center of claim 1, wherein the second deployment of the cluster of computers comprises between approximately 80% and approximately 130% of the first deployment of the plurality of computers.

26. The data center of claim 1, wherein the peak power draw from each of the computers is a nameplate power draw.

27. The data center of claim 1, wherein the second deployment of the cluster of computers installed in the data center subsequent to the first deployment of the plurality of computers comprises approximately 7% of the first deployment of the plurality of computers based on the workload type of the first and second deployment of computers being only a web-search application.

28. The data center of claim 1, wherein the second deployment of the cluster of computers installed in the data center subsequent to the first deployment of the plurality of computers comprises approximately 40% of the first deployment of the plurality of computers based on the workload type of the first and second deployment of computers being a plurality of different applications.

29. The data center of claim 1, wherein the second deployment of the cluster of computers installed in the data center subsequent to the first deployment of the plurality of computers comprises approximately 7% of the first deployment of the plurality of computers based on the workload type of the first and second deployment of computers being only a web-search application and a percentage of operating time of the computers in the first and second deployments spent in a power-capping mode being approximately 0%.

30. The data center of claim 1, wherein the second deployment of the cluster of computers installed in the data center subsequent to the first deployment of the plurality of computers comprises approximately 7% of the first deployment of the plurality of computers based on the workload type of the first and second deployment of computers being a plurality of different applications and a percentage of operating time of the computers in the first and second deployments spent in a power-capping mode being approximately 2%.

31. The method of claim 9, wherein the peak power draw from each of the computers is a nameplate power draw.

32. The method of claim 9, further comprising:
determining that the second deployment of the cluster of computers installed in the data center subsequent to the first deployment of the plurality of computers comprises approximately 7% of the first deployment of the plurality of computers based on the workload type of the first and second deployment of computers being only a web-search application.

33. The method of claim 9, further comprising:
determining that the second deployment of the cluster of computers installed in the data center subsequent to the first deployment of the plurality of computers comprises approximately 40% of the first deployment of the plurality of computers based on the workload type of the first and second deployment of computers being a plurality of different applications.

34. The method of claim 9, further comprising:
determining that the second deployment of the cluster of computers installed in the data center subsequent to the first deployment of the plurality of computers comprises approximately 7% of the first deployment of the plurality of computers based on the workload type of the first and second deployment of computers being only a web-search application and a percentage of operating time of the computers in the first and second deployments spent in a power-capping mode being approximately 0%.

35. The method of claim 9, further comprising:
determining that the second deployment of the cluster of computers installed in the data center subsequent to the first deployment of the plurality of computers comprises approximately 7% of the first deployment of the plurality of computers based on the workload type of the first and second deployment of computers being a plurality of different applications and a percentage of operating time of the computers in the first and second deployments spent in a power-capping mode being approximately 2%.

\* \* \* \* \*

UNITED STATES PATENT AND TRADEMARK OFFICE
CERTIFICATE OF CORRECTION

| | | |
|---|---|---|
| PATENT NO. | : 8,595,515 B1 | Page 1 of 1 |
| APPLICATION NO. | : 12/134971 | |
| DATED | : November 26, 2013 | |
| INVENTOR(S) | : Wolf-Dietrich Weber et al. | |

It is certified that error appears in the above-identified patent and that said Letters Patent is hereby corrected as shown below:

Title Page 4, Column 1, item (56), (Other Publications), line 14, delete "pdtPainter." and insert -- pdfPainter. --.

Title Page 4, Column 2, item (56), (Other Publications), line 46, delete "Dec. 31, 2012," and insert -- Dec. 3, 2012, --.

Signed and Sealed this
Fifteenth Day of April, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,595,515 B1 | Page 1 of 1 |
| APPLICATION NO. | : 12/134971 | |
| DATED | : November 26, 2013 | |
| INVENTOR(S) | : Weber et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 732 days.

Signed and Sealed this
Twenty-first Day of July, 2015

Michelle K. Lee
*Director of the United States Patent and Trademark Office*